(12) United States Patent
Song et al.

(10) Patent No.: US 11,480,797 B2
(45) Date of Patent: Oct. 25, 2022

(54) WAVEGUIDE-BASED DISPLAY MODULE, AND IMAGE GENERATION MODULE AND APPLICATION THEREOF

(71) Applicant: CHENGDU IDEALSEE TECHNOLOGY CO., LTD., Chengdu (CN)

(72) Inventors: Haitao Song, Chengdu (CN); Xudong Zhou, Chengdu (CN); Changcheng Yao, Chengdu (CN); Jiazhou Wang, Chengdu (CN)

(73) Assignee: CHENGDU IDEALSEE TECHNOLOGY CO., LTD., Chengdu (CN)

( * ) Notice: Subject to any disclaimer, the term of this patent is extended or adjusted under 35 U.S.C. 154(b) by 96 days.

(21) Appl. No.: 17/257,890

(22) PCT Filed: Jul. 5, 2019

(86) PCT No.: PCT/CN2019/094861
§ 371 (c)(1),
(2) Date: Jan. 5, 2021

(87) PCT Pub. No.: WO2020/007360
PCT Pub. Date: Jan. 9, 2020

(65) Prior Publication Data
US 2021/0271086 A1 Sep. 2, 2021

(30) Foreign Application Priority Data

Jul. 6, 2018 (CN) .......................... 201810739208.3
Jul. 6, 2018 (CN) .......................... 201810739825.3

(Continued)

(51) Int. Cl.
| | | |
|---|---|---|
| *G02B 27/01* | (2006.01) | |
| *G02B 26/10* | (2006.01) | |
| *F21V 8/00* | (2006.01) | |

(52) U.S. Cl.
CPC ....... *G02B 27/0172* (2013.01); *G02B 6/0016* (2013.01); *G02B 6/0036* (2013.01);
(Continued)

(58) Field of Classification Search
CPC ......................... G02B 26/103; G02B 27/0172; G02B 6/0016; G02B 6/0036; G02B 6/0076
See application file for complete search history.

(56) References Cited

U.S. PATENT DOCUMENTS

| | | | | |
|---|---|---|---|---|
| 2016/0004090 A1* | 1/2016 | Popovich | ............. | G02B 6/0028 359/567 |
| 2016/0085029 A1 | 3/2016 | Huang | | |
| 2021/0271086 A1* | 9/2021 | Song | .................... | G02B 6/0036 |

FOREIGN PATENT DOCUMENTS

| | | |
|---|---|---|
| CN | 102798979 | 11/2012 |
| CN | 106896493 | 6/2017 |

(Continued)

*Primary Examiner* — Tina M Wong

(57) ABSTRACT

Disclosed are a waveguide display module, and an image generation module and application corresponding thereto. By wavelength division multiplexing, an image generation unit generates through modulation mixed light beams containing at least two groups of sub-images of different wavelengths. The mixed light beams generated through modulation by the image generation unit are coupled into a waveguide module, which module has in-coupling units arranged in multiple layers and out-coupling units arranged in multiple layers, an in-coupling unit in each layer being configured to couple in light of different wavelength ranges. Emergent images, formed after mixed light beams of an image to be displayed generated by the image generation (Continued)

unit are coupled out by the out-coupling units of the waveguide module, are spliced into the image to be displayed.

14 Claims, 14 Drawing Sheets

(30) Foreign Application Priority Data

Jul. 19, 2018 (CN) .......................... 201810794131.X
Sep. 18, 2018 (CN) .......................... 201811085823.3

(52) U.S. Cl.
CPC ......... *G02B 6/0076* (2013.01); *G02B 26/103* (2013.01); *G02B 2027/0112* (2013.01); *G02B 2027/0123* (2013.01)

(56) References Cited

FOREIGN PATENT DOCUMENTS

| | | |
|---|---|---|
| CN | 207067643 | 3/2018 |
| CN | 108107579 | 6/2018 |

\* cited by examiner

WAVEGUIDE-BASED DISPLAY MODULE, AND IMAGE GENERATION MODULE AND APPLICATION THEREOF

This application claims the priorities to Chinese patent application CN201810739208.3 filed on Jul. 6, 2018 entitled "Waveguide display module, and image generation module and application thereof", the Chinese patent application CN201810739825.3 filed on Jul. 6, 2018 entitled "Fiber scanning module, waveguide display module, and near-eye display device", the Chinese patent application CN201810794131.X filed on Jul. 19, 2018 entitled "Waveguide display module, image generation module and application thereof", and the Chinese patent application CN201811085823.3 filed on Sep. 18, 2018 entitled "Waveguide display module and display device", the entirety of each of which is incorporated herein by reference.

FIELD OF THE INVENTION

The present disclosure relates to the field of display technology, and in particular, to a fiber scanning module, a waveguide display module, and a display device.

BACKGROUND OF THE INVENTION

Most of the existing near-eye display modules used in the field of augmented reality (AR) have the problem that the viewing angle is not large. Taking a waveguide display module in the existing technologies as an example: an existing waveguide display module usually includes an image source 1, an eyepiece system 2, an in-coupling grating 3, a waveguide 4, and an out-coupling grating 5, as shown in FIG. 1. After a light beam emitted by the image source 1 is collimated by the eyepiece system 2, the light beam is coupled into the waveguide 4 at a certain angle by the in-coupling grating 3 for total reflection transmission, and then the out-coupling grating 5 disposed in the waveguide at a position corresponding to an exit pupil couples the light beam transmitted in the waveguide out to a human eye. Because gratings are elements sensitive to incident angles, in the case of an in-coupling grating, light incident on the grating at different angles results in different diffraction efficiency and diffraction angles. Maximum diffraction efficiency will be attained when the light falls on the grating at a particular incident angle. When the light falls on the grating at an incident angle deviating from this particular incident angle, the diffraction efficiency will drop rapidly (that is, the grating hardly diffracts the light incident at such an angle, and the light is almost transmitted through the grating). As shown in FIG. 2, in a diffraction efficiency profile of the in-coupling grating, a horizontal coordinate designates an angle of the light beam incident on the grating, and a vertical coordinate designates the diffraction efficiency of the grating; an effective diffraction angular bandwidth of the grating shown in the figure is ±20°. FIG. 3 is a diagram showing transmission of the light beam, in which light beam 1 represents a diffracted light path of incident light at −20°; light beam 2 represents a diffracted light path of incident light at 0°; and light beam 3 represents a diffracted light path of incident light at +20°. After the light beam 1, the light beam 2, and the light beam 3 are coupled into the waveguide for total reflection transmission, they are coupled out of the waveguide by the out-coupling grating and presented to the human eye. Light incident at other angles (that is, light incident at an angle beyond the range of −20° to +20°) results low diffraction efficiency, and such light is almost transmitted through the grating without any angle change; as shown by light beam 4 in the figure, this light beam may also be transmitted in the waveguide in a totally reflected way, but the out-coupling grating does not diffract this light beam; this light beam thus cannot be coupled out of the waveguide to the human eye. As a result, the human eye can only observe a viewing angle in a range of −20° to +20°.

From the Chinese patent CN107024769, it can be seen that, splicing has been utilized to expand viewing angles. This splicing method however requires addition of a group of corresponding input light source modules every time a group of viewing angles are added by splicing, and is therefore a type of hardware splicing. This splicing scheme is not capable of miniaturizing a near-eye display module.

One problem to be solved in the art is how to realize both a large viewing angle and miniaturization of a near-eye display module.

SUMMARY OF THE INVENTION

The present disclosure mainly relates to a series of waveguide display modules and image generation modules thereof capable of both a large viewing angle and miniaturization of a near-eye display module.

According to an embodiment of the present disclosure, it is provided a fiber scanning module, including a fiber scanning display and an input light source. The fiber scanning display includes at least one scanning fiber. One path of the input light source includes N groups of light sources. Each group of light sources includes at least three types of light-emitting units of R, G, and B. In the N groups of light sources, light-emitting units of a same color channel are configured to emit light of different wavelengths, N being an integer greater than or equal to 2.

In a preferred embodiment, light beams generated by N groups of light sources in one path of the input light source are combined and then input into one scanning fiber in the fiber scanning display.

In a preferred embodiment, one scanning fiber corresponds to one path of the input light source, and when the fiber scanning display includes more than two scanning fibers, configurations of wavelengths of input light sources corresponding to respective ones of the scanning fibers are the same.

In a preferred embodiment, N groups of light sources in one path of the input light source are N groups of laser tube light sources or N groups of LED light sources.

In a preferred embodiment, the N is equal to 2.

According to an embodiment of the present disclosure, it is also provided a flat panel display. Each pixel of the flat panel display includes at least two groups of sub-pixels. Each group of sub-pixels includes three color units of R, G, and B. Same color units in the groups of sub-pixels are configured with different wavelengths.

In a preferred embodiment, the flat panel display is one of a liquid crystal display (LCD), an organic light emitting diode (OLED) display, a liquid crystal silicon (LCOS) display, and a DLP display.

According to an embodiment of the present disclosure, it is also provided a waveguide display module, including:

an image segmentation unit for partitioning an image to be displayed into M sub-images, M being an integer greater than or equal to 2;

an image generation unit including one or more image generation sub-units, wherein when the image generation unit includes at least two image generation sub-units, configurations of wavelengths of light generated by all the image generation sub-units are the same; each of the image generation sub-units generates through modulation mixed light beams of N sub-images through wavelength division multiplexing, light beams of a same color in the light beams of the N sub-images generated by each of the image generation sub-units having different wavelengths, N being an integer greater than or equal to 2; the M sub-images are generated through modulation and emitted by the image generation unit simultaneously by means of the one or more image generation sub-units, collimated by a collimation optical system, and then form mixed light beams of the image to be displayed containing light beams of the M sub-images; and a waveguide module arranged on a light output path of the image generation unit, wherein the waveguide module has in-coupling units arranged in multiple layers and out-coupling units arranged in multiple layers, an in-coupling unit in each of the layers being configured to couple in light of a different wavelength range, wherein emergent images, formed after the mixed light beams of the image to be displayed generated by the image generation unit are coupled out by the out-coupling units of the waveguide module, are spliced into the image to be displayed.

In a preferred embodiment, when the image generation unit generates through modulation and emits the M sub-images simultaneously by means of a plurality of image generation sub-units, light beams generated by the plurality of image generation sub-units are spliced to each other before falling on the waveguide module.

In a preferred embodiment, when each of the sub-images is generated through modulation by three types of light-emitting units of R, G, and B, the waveguide module includes in-coupling units arranged in 3×N layers and out-coupling units arranged in 3×N layers. Except an in-coupling unit in a last layer, an in-coupling unit in each of other layers is configured to couple only a light beam of one wavelength in the mixed light beams of the image to be displayed. The in-coupling units are reflection gratings or filters.

In another preferred embodiment, the waveguide module includes waveguide substrates stacked in N layers, and when each of the sub-images is generated through modulation by three types of light-emitting units of R, G, and B, except an in-coupling unit in a last layer of the N layers of the waveguide substrates, an in-coupling unit of a waveguide substrate in each of other layers is a filter, each filter being designed to reflect light beams of three RGB wavelengths in light beams of a corresponding sub-image and transmit light beams of other wavelengths.

In further another preferred embodiment, when each of the sub-images is generated through modulation by three types of light-emitting units of R, G, and B, the waveguide module includes in-coupling units arranged in 3×N layers and out-coupling units arranged in 3×N layers. Except an in-coupling unit in a last layer, all other in-coupling units are long-wave pass filters or short-wave pass filters. When all the in-coupling units are long-wave pass filters, long-wave pass filters from an in-coupling unit in a first layer to an in-coupling unit in a last but one layer have cut-off wavelengths that gradually increase, and when all the in-coupling units are short-wave pass filters, short-wave pass filters from an in-coupling unit in a first layer to an in-coupling unit in a last but one layer have cut-off wavelengths that gradually decrease. An in-coupling unit in each layer only couples a light beam of one wavelength in the mixed light beams of the image to be displayed.

In a preferred embodiment, the out-coupling units are out-coupling gratings or out-coupling mirror arrays.

In a preferred embodiment, each group of waveguide modules is provided therein with a relay unit for performing pupil expansion in a direction perpendicular to a pupil expansion direction of the out-coupling units.

In a preferred embodiment, adjacent sub-images in a plurality of sub-images formed through partitioning by the image segmentation unit have a same image area.

In a preferred embodiment, the image generation unit is the aforementioned fiber scanning module.

According to an embodiment of the present disclosure, it is also provided a display device including at least one group of the aforementioned waveguide display modules.

Compared with the existing technologies, the present disclosure has the following beneficial effects.

By utilizing the present disclosure, both a large viewing angle and miniaturization of a near-eye display module can be realized. The fiber scanning module, the flat panel display, and the waveguide display module provided by the present disclosure, by using wavelength division multiplexing, can reduce the number of scanning fibers while maintaining a resolution and a viewing angle that are realized being the same, which is beneficial to miniaturized production of near-eye display devices.

BRIEF DESCRIPTION OF THE DRAWINGS

In order to more clearly explain the embodiments of the present disclosure or the implementations in the existing technologies, drawings that need to be used in the description of the embodiments or the existing technologies will be briefly introduced below. Obviously, the drawings in the following description are only some embodiments of the present disclosure. For those of ordinary skill in the art, other drawings can be obtained based on these drawings without any creative work.

DETAILED DESCRIPTION OF THE EMBODIMENTS

Figure 1:
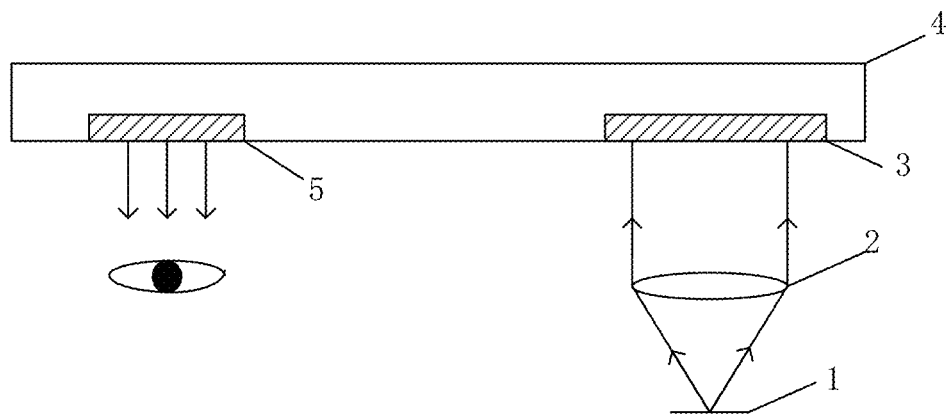
FIG. 1 is a schematic diagram of a near-eye display module in the field of augmented reality in the prior art.
Figure 2:
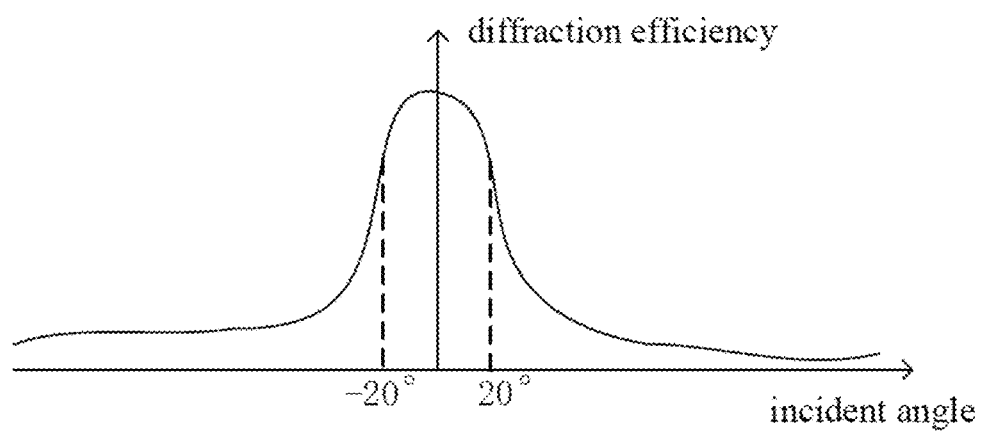
FIG. 2 is a diffraction efficiency profile of an in-coupling grating of the near-eye display module shown in FIG. 1.
Figure 3:
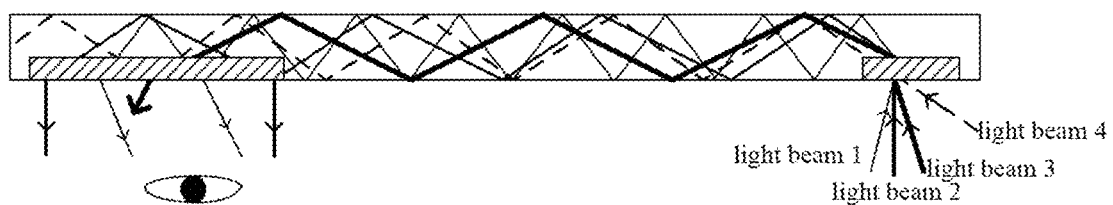
FIG. 3 is a diagram showing transmission paths of light beams at different angles in the near-eye display module shown in FIG. 1.

Embodiments of the present disclosure will be clearly and completely described below in conjunction with the accompanying drawings in the embodiments of the present disclosure. Obviously, the described embodiments are only some of, rather than all, the embodiments of the present disclosure. Other embodiments obtained by those of ordinary skill in the art based on the embodiments of the present disclosure without creative work shall all fall within the protection scope of the present disclosure.

According to the present disclosure, based on the concept of wavelength division multiplexing, a series of waveguide display modules and corresponding image generation modules and application thereof are provided.

A waveguide display module mainly includes an image segmentation unit, an image generation unit, and a waveguide module. The image segmentation unit is used to partition an image to be displayed into M sub-images, M being an integer greater than or equal to 2. The image generation unit includes one or more image generation sub-units. When the image generation unit includes at least two image generation sub-units, configurations of wavelengths of light emitted by all the image generation sub-units are the same. Mixed beams of N sub-images are generated through modulation by each of the image generation sub-units using wavelength division multiplexing. Light beams of a same color in the light beams of the N sub-images generated by each of the image generation subunits have different wavelengths, N being an integer greater than or equal to 2. The image generation unit, by means of one or more image generation sub-units, generates through modulation and emits the M sub-images simultaneously; the emitted M sub-images, after being collimated by a collimation optical system, form mixed light beams of the image to be displayed including light beams of the M sub-images. The waveguide module is disposed on a light output path of the image generation unit. The waveguide module has in-coupling units arranged in multiple layers and out-coupling units arranged in multiple layers. An in-coupling unit in each of the layers is configured to couple in light of a different wavelength range. The out-coupling units are positioned correspondingly depending on a condition of the light coupled in by the in-coupling units. The in-coupling units and the out-coupling units cooperate with each other, so that emergent images, formed after the mixed light beams of the image to be displayed generated by the image generation unit are coupled out by the out-coupling units of the waveguide module, are spliced into the image to be displayed.

In the embodiments of the present disclosure, the image generation unit may be a fiber scanning module based on a particular structure, or a flat panel display based on a particular structure, etc. Devices, in which a light source, by using wavelength division multiplexing, can achieve such an effect that an emitted same pixel light spot contains light information of multiple pixels of multiple sub-images, may be used as the image generation unit in the embodiments of the present disclosure.

The present disclosure will be described below by way of several groups of embodiments in conjunction with the accompanying drawings. In the description, in order to avoid repetition of the description, several common image generation units will be described separately; waveguide display modules, although involved in several groups of embodiments, are different only in their image generation units, and therefore will be described in detail in one group of the embodiments (the group of embodiments in which a fiber scanning module is used as an image source), and for the parts that are not detailed in other groups of embodiment, reference may be made to this group of embodiments.

Embodiments of Fiber Scanning Modules

In some embodiments of the present disclosure, a fiber scanning module includes a fiber scanning display and an input light source. The fiber scanning display includes at least one scanning fiber. The fiber scanning display here includes at least one actuator (such as a piezoelectric actuator), each of which drives one or more scanning fibers. One scanning fiber corresponds to one path of input light source. The input light source here may be a laser light source or other light sources such as a light-emitting diode (LED). One path of the input light source includes N groups of light sources. Each group of light sources includes at least three types of light-emitting units, namely R, G, and B light-emitting units, among which, one of the three types of light-emitting units may include a plurality of light emitters. For example, the R light-emitting unit may be formed by two light emitters R' and R" with light thereof being mixed. When each type of the light-emitting units includes a plurality of light emitters, light energy can be increased. In a preferred embodiment, when the fiber scanning display includes more than two scanning fibers, wavelength configurations of input light sources corresponding to respective ones of the scanning fibers are the same.

Figure 4A:
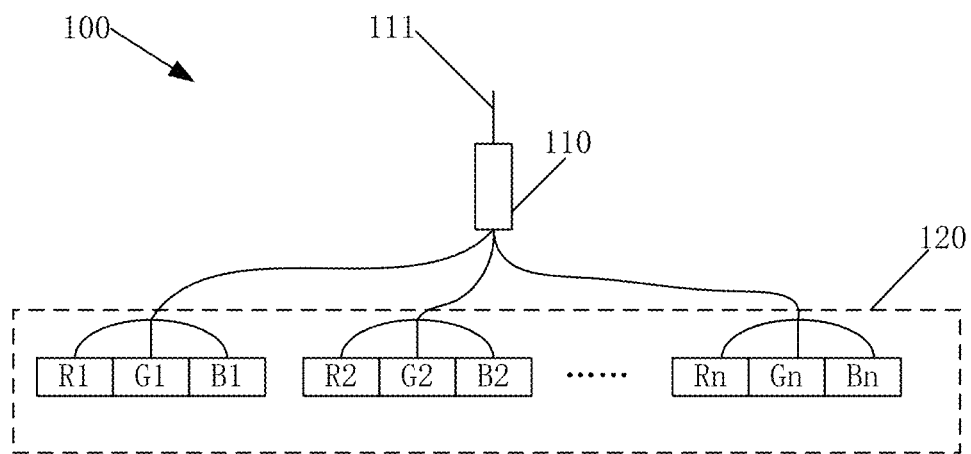
FIG. 4A is a schematic diagram showing a structure of a fiber scanning module disclosed in an embodiment of the present disclosure.

FIG. 4A shows an example in which a fiber scanning module 100 includes one actuator 110. The actuator 110 drives one scanning fiber 111. In FIG. 4A, one path of input light source includes N groups of laser light sources 120. Each group of laser light sources includes three monochromatic lasers, namely an R laser, a G laser, and a B laser (which refer to a red laser, a green laser, and a blue laser, respectively). In the N groups of laser light sources, N monochromatic lasers of a same color channel are configured to emit light of different wavelengths. Light beams generated by the N groups of laser light sources are input into one scanning fiber 111 in the fiber scanning display 100, where N is an integer greater than or equal to 2. In a preferred embodiment, the light beams generated by the N groups of laser light sources are combined and then input into the scanning fiber in the fiber scanning display. This combining of light beams may be combining of a red light beam, a green light beam, and a blue light beam produced by respective ones of the three R, G, and B monochromatic lasers in a single group of laser sources, or combining of all the light beams produced by the N groups of laser sources, or combining involving the foregoing two situations. The present disclosure is not limited in this respect.

In the N groups of laser light sources, N monochromatic lasers of a same color channel are configured to emit light of different wavelengths. Taking the red monochromatic laser as an example, as shown in FIG. 4A, a monochromatic laser R1, a monochromatic laser R2 . . . , and a monochromatic laser Rn all produce red light, but the red light produced has different wavelengths. Similarly, a monochromatic laser G1, a monochromatic laser G2 . . . , and a monochromatic laser Gn all produce green light, but the green light produced has different wavelengths; and a monochromatic laser B1, a monochromatic laser B2 . . . , and a monochromatic laser Bn all produce blue light, but the blue light produced has different wavelengths.

Figure 4B:
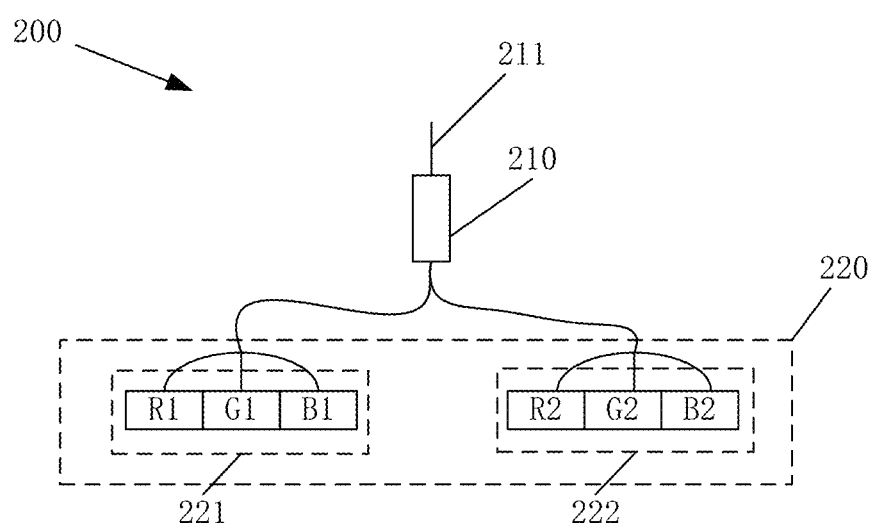
FIG. 4B is a schematic diagram showing a structure of another fiber scanning module disclosed in an embodiment of the present disclosure.

The following gives an example in which one path of the input light source includes two groups of laser light sources. As shown in FIG. 4B, a fiber scanning module 200 has an input light source 220 that includes two groups of laser light sources, namely 221 and 222. The first group of laser light sources 221 includes three monochromatic lasers, namely R1, G1, and B1. The second group of laser light sources 222 includes three monochromatic lasers, namely R2, G2, and B2. In the two groups of laser light sources, a difference in central wavelength values between two monochromatic lasers of a same color channel is preferably in a range of 5 nm to 30 nm. For example, in FIG. 4B, wavelengths of the lasers may be configured as follows: an emission wavelength of a red laser R1 is 650 nm, an emission wavelength of a green laser G1 is 530 nm, and an emission wavelength of a blue laser B1 is 460 nm; an emission wavelength of a red laser R2 is 635 nm, an emission wavelength of a green laser G2 is 520 nm, and an emission wavelength of a blue laser B2 is 450 nm. Both the two groups of laser light sources 221 and 222 are input into the scanning fiber 211 in the fiber scanning display 210. In this way, each pixel scanned by the scanning fiber 211 carries information of light emitted by both the first group of laser light sources 221 and the second group of laser light sources 222.

Figure 4C:
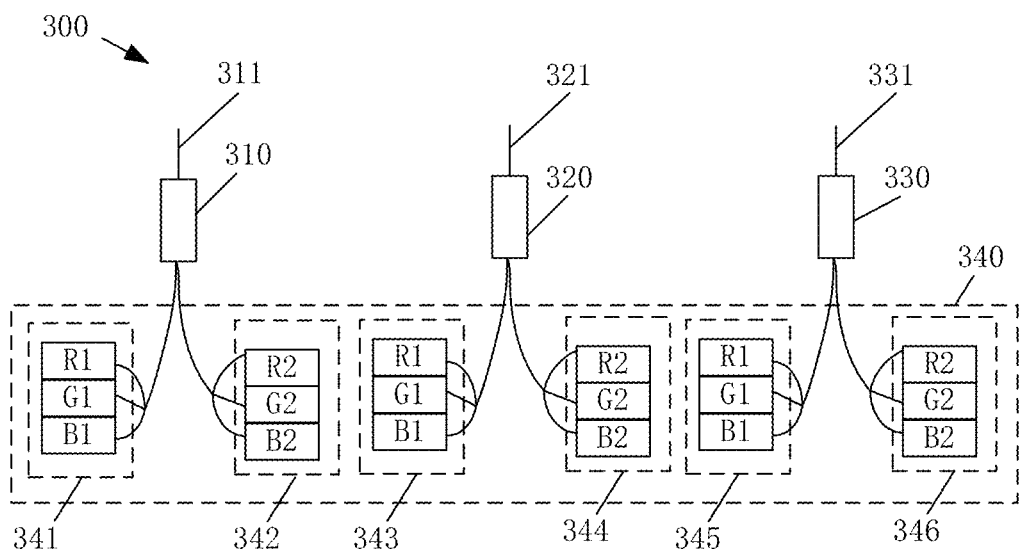
FIG. 4C is a schematic diagram showing a structure of further another fiber scanning module disclosed in an embodiment of the present disclosure.

FIG. 4C gives an example in which a fiber scanning display 300 includes three actuators 310, 320, and 330. The actuator 310, the actuator 320, and the actuator 330 drive a scanning fiber 311, a scanning fiber 321, and a scanning fiber 331, respectively. An input light source 340 in the figure includes six groups of laser light sources 341, 342, 343, 344, 345, and 346. Among them, light beams generated by the laser light sources 341 and 342 are input to the scanning fiber 311 driven by the actuator 310; light beams generated by the laser light sources 343 and 344 are input to the scanning fiber 321 driven by the actuator 320, and light beams generated by the laser light sources 345 and 346 are input into the scanning fiber 331 driven by the actuator 330. The laser light source 341 includes three monochromatic lasers R1, G1, B1, and the laser light source 342 includes three monochromatic lasers R2, G2, and B2. In the two groups of laser light sources, two monochromatic lasers of a same color channel emit light of different wavelengths. Wavelength configurations of the input light sources corresponding to respective ones of the scanning fiber 321 and the scanning fiber 331 are the same as that of the scanning fiber 311.

First Group of Embodiments of a Waveguide Display Module (in which a Fiber Scanning Module is Used as an Image Generation Unit)

In some embodiments of the present disclosure, a waveguide display module includes an image segmentation unit, an image generation unit, and a waveguide module.

The image segmentation unit is used to partition an image to be displayed into M sub-images, where M is an integer greater than or equal to 2. The M sub-images can be understood as M sub-images of different viewing angles.

The image generation unit is the fiber scanning module in the foregoing embodiments of the fiber scanning module. The fiber scanning module generates through modulation mixed light beams including N sub-images for one scanning fiber by means of wavelength division multiplexing, where N is an integer greater than or equal to 2. The fiber scanning module generates through modulation and emits the M sub-images simultaneously through one or more scanning fibers; the M sub-images are then collimated by a collimation optical system and then form mixed light beams of the image to be displayed. When the fiber scanning module generates through modulation and emits the M sub-images simultaneously through one scanning fiber, M=N; and when the fiber scanning module generates through modulation and emits the M sub-images simultaneously through a plurality of scanning fibers, M>N. The collimation optical system may be a separate module disposed on a light output path of a light-emitting unit, or the collimation system may be packaged in the fiber scanning module. The present disclosure is not limited in this respect.

The waveguide module is disposed on a light output path of the image generation unit. The waveguide module has in-coupling units arranged in multiple layers and out-coupling units arranged in multiple layers. An in-coupling unit in each of the layers is configured to couple in light of a different wavelength range. Emergent images, formed after the mixed light beams of the image to be displayed generated by the image generation unit are coupled out by the out-coupling units of the waveguide module, are spliced into the image to be displayed. When the fiber scanning display includes more than two scanning fibers, wavelength configurations of input light sources corresponding to respective ones of the scanning fibers are the same, and therefore these more than two fibers can share the waveguide module.

The waveguide module may be designed in different forms in different embodiments. For example, the waveguide module may include waveguides that are stacked multiple layers, or may be one or more waveguides provided therein with in-coupling units and out-coupling units arranged in multiple layers. Forms of the waveguide module are not specifically limited in the embodiments of the present disclosure. In subsequent embodiments, several specific forms will be described as examples. The function of the waveguide module is to separate the sub-images from the mixed light beams generated by the image generation unit, couple them out and splice them into the image to be displayed.

Figure 5:
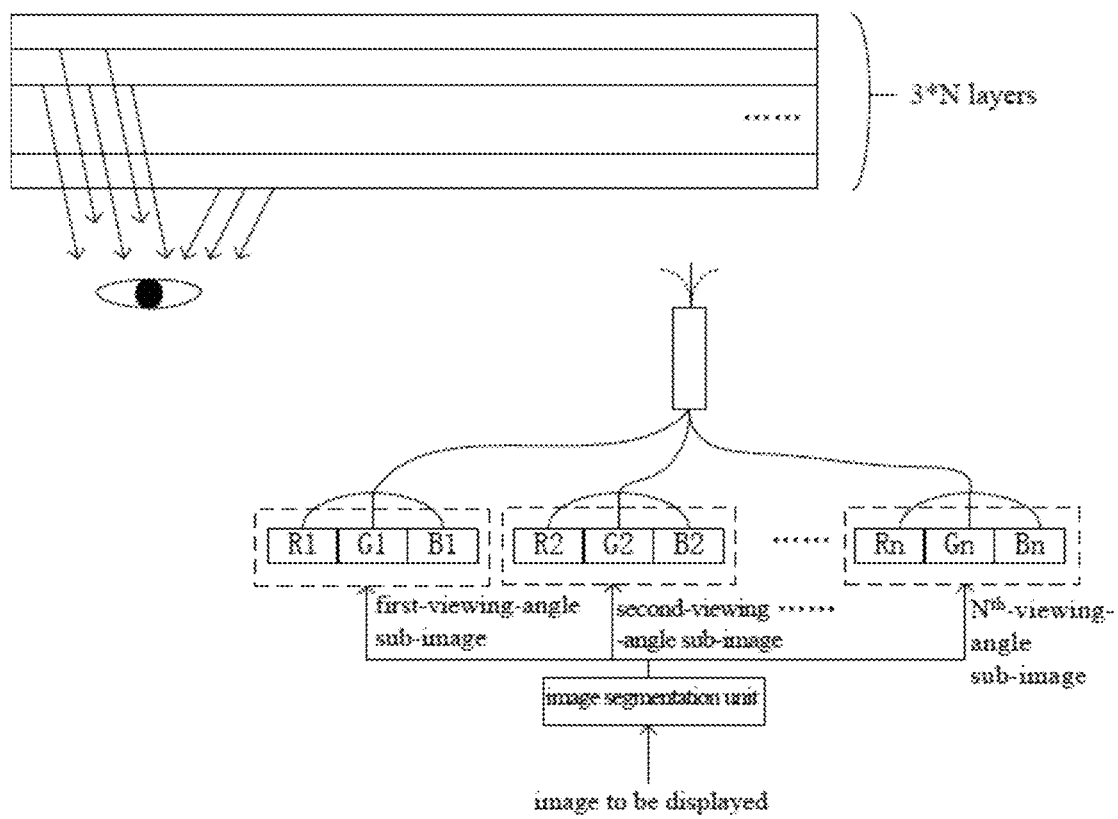
FIG. 5 is a schematic diagram showing a structure of a waveguide display module disclosed in an embodiment of the present disclosure.

The embodiment shown in FIG. 5 gives an example in which the fiber scanning module generates through modulation and emits the M sub-images simultaneously through one scanning fiber. At this time, M=N. That is, in FIG. 5, the image segmentation unit partitions an image to be displayed into N sub-images. Each of the sub-images is a sub-image of one viewing angle. A path of input light source corresponding to one scanning fiber includes N groups of laser light sources. Each group of laser light sources includes three monochromatic lasers, namely R, G, and B. Each group of laser light sources modulates a respective sub-image of one viewing angle of the above N sub-images of different viewing angles. In other words, a first laser light source modulates a first-viewing-angle sub-image; a second laser light source modulates a second-viewing-angle sub-image . . . , and an $N^{th}$ laser light source modulates an $N^{th}$-viewing-angle sub-image. In this way, each pixel point output by a single scanning fiber in FIG. 5 carries pixel information of sub-images of N different viewing angles. Mixed image light beams emitted by the scanning fiber is collimated and then coupled into the waveguide module. In FIG. 5, the waveguide module, for example, includes waveguides that are stacked in 3×N layers. The waveguide in each layer is configured to only couple in a light beam output by one monochromatic laser. For example, the waveguide in a first layer only couples in a light beam produced by a red laser R1 in the first group of laser light sources; the waveguide in a second layer only couples in a light beam produced by a green laser G1 in the first group of laser light sources; and the waveguide in a third layer only couples in a light beam produced by a green laser B1 in the first group of laser light sources . . . and so on in a similar fashion. Each monochromatic laser corresponds to a waveguide in one layer. Of course, the foregoing correspondence is only an example; each monochromatic laser corresponding to a waveguide in one layer will suffice; and a positioning sequence of the waveguides is not limited, as long as a waveguide in each layer can be designed to only couple in a light beam output by one monochromatic laser. The in-coupling units and the out-coupling units of the waveguide module will be described with reference to FIGS. 6A, 6C, 6D, and 7A in later embodiments of this group of embodiments. Light beams of the sub-images of N viewing angles are transmitted on respective waveguide substrates and then coupled out and spliced into the abovementioned image to be displayed. In this way, images of N viewing angles can be seen, which broadens the viewing angle of the display module.

In addition, assuming that the image to be displayed has 1000 pixels, according to a method in the existing technologies (in which partial multiplexing is not used), when scanning is performed using one scanning fiber, the scanning fiber needs to scan 1000 pixels. However, after the image to be displayed is partitioned into sub-images of N viewing angles, assuming that the sub-images of the N viewing angles have a same number of pixels, and that light beams of the sub-images of the N viewing angles are mixed and input to a same scanning fiber by means of wavelength division multiplexing, then this fiber only needs to scan 1000/N pixel points, which improves refresh rate of images.

Figure 6A:
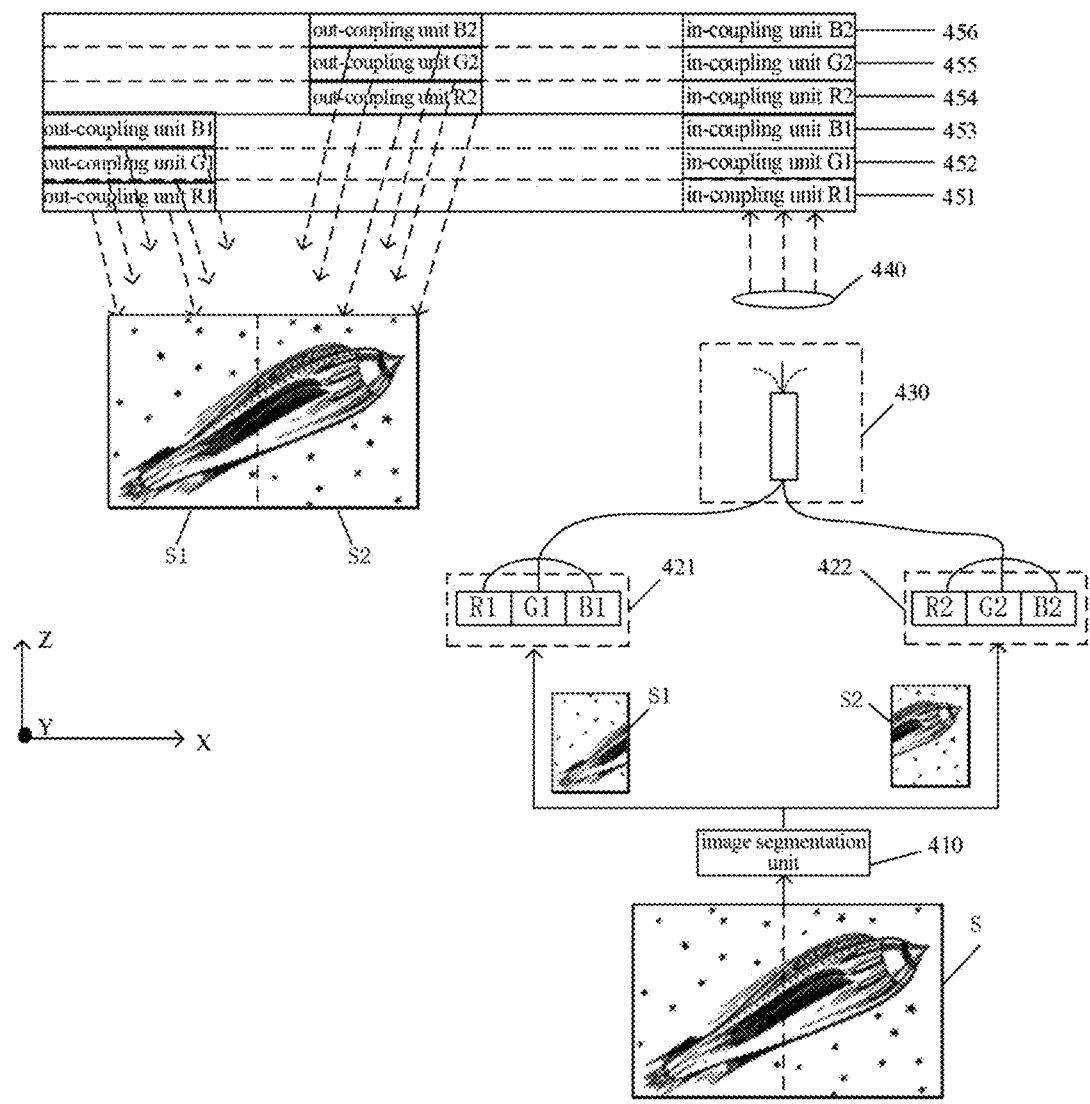
FIG. 6A is a schematic diagram showing a structure of another waveguide display module disclosed in an embodiment of the present disclosure.

The embodiment of FIG. 6A takes the N in FIG. 5 being equal to 2 as an example. FIG. 6A shows a waveguide display module. An image S to be displayed is shown in the lower right corner of the figure. The image S is partitioned by an image segmentation unit 410 into a first-viewing-angle sub-image S1 and a second-viewing-angle sub-image S2.

A first group of laser light sources 421 in FIG. 6A includes three monochromatic lasers namely red, green and blue, among which the red laser generates red light of a wavelength R1, the green laser generates green light of a wavelength G1, and the blue laser generates blue light of a wavelength B1. A second group of laser light sources 422 includes three monochromatic lasers namely red, green and blue, among which the red laser generates red light of a wavelength R2, the green laser generates green light of a wavelength G2, and the blue laser generates blue light of a wavelength B2. The first group of laser light sources 421 is used to generate through modulation pixel information of the first-viewing-angle sub-image S1, and the second group of laser light sources 422 is used to generate through modulation pixel information of the second-viewing-angle sub-image S2. Light beams generated by the first group of laser light sources 421 and light beams generated by the second group of laser light sources 422 are mixed and input into a same scanning fiber in a light scanner 430.

It will be appreciated that assuming that the image S to be displayed has 120 pixels and is scanned by a single scanning fiber, then the scanning fiber needs to scan 120 pixel points. However, after the image S to be displayed is partitioned into the first-viewing-angle sub-image S1 and the second-viewing-angle sub-image S1, assuming that the first-viewing-angle sub-image S1 and the second-viewing-angle sub-image S1 each have 60 pixels, and that the first-viewing-angle sub-image S1 and the second-viewing-angle sub-image S2 are generated through modulation by respective ones of the first group of laser light sources 421 and the second group of laser light sources and then mixed and input into a same scanning fiber, then this fiber only needs to scan 60 pixels. This improves the refresh rate of images.

After the mixed light beams of the first-viewing-angle sub-image S1 and the second-viewing-angle sub-image S2 are emitted by the light scanner 430, the mixed light beams are collimated by a collimation device such as an eyepiece optical system 440, and then directed toward waveguide substrates stacked in six layers. A waveguide substrate in each layer couples in a light beam produced by a monochromatic laser.

Figure 6B:
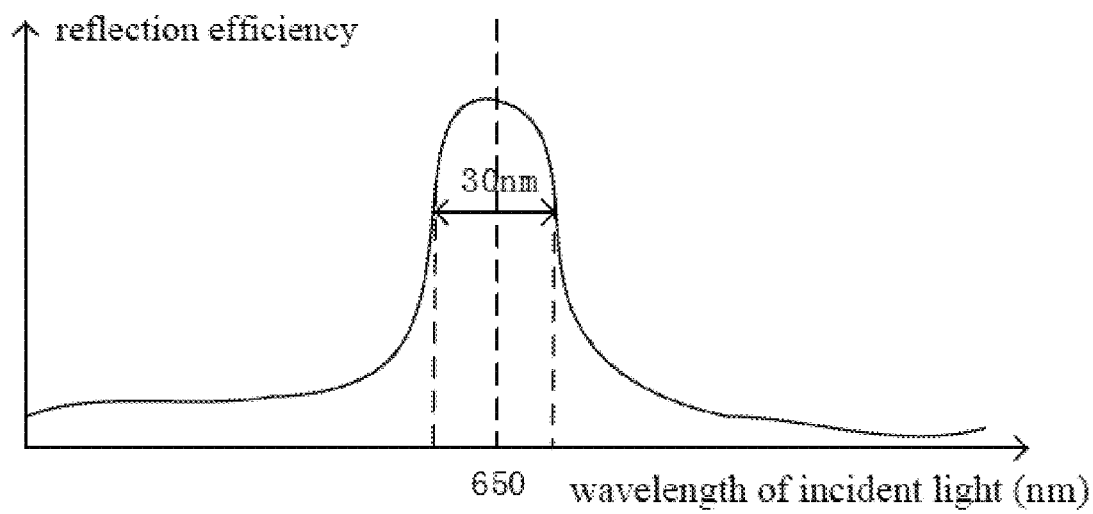
FIG. 6B is a schematic diagram showing reflection efficiency of an in-coupling unit R1 of the display module shown in FIG. 6A.
Figure 6C:
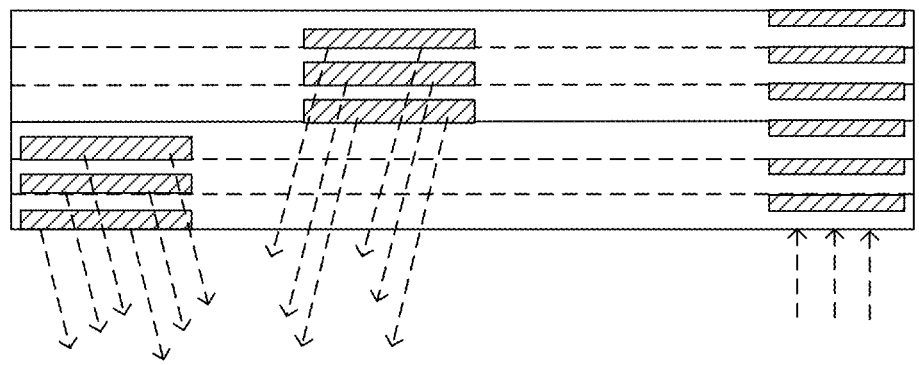
FIG. 6C is a schematic diagram showing a structure of a waveguide module in the display module shown in FIG. 6A.
Figure 6D:
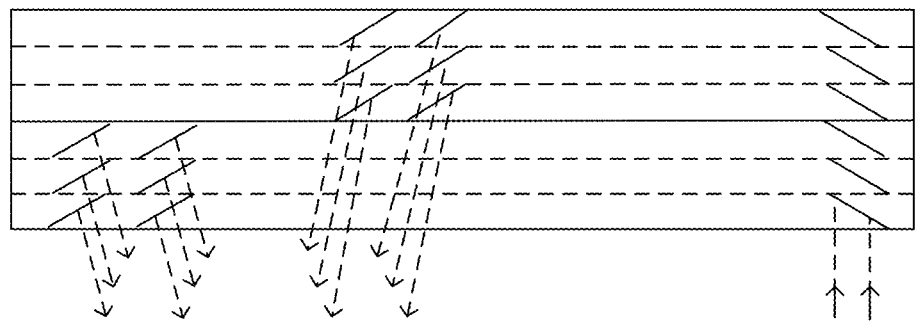
FIG. 6D is a schematic diagram showing another structure of the waveguide module in the display module shown in FIG. 6A.
Figure 7A:
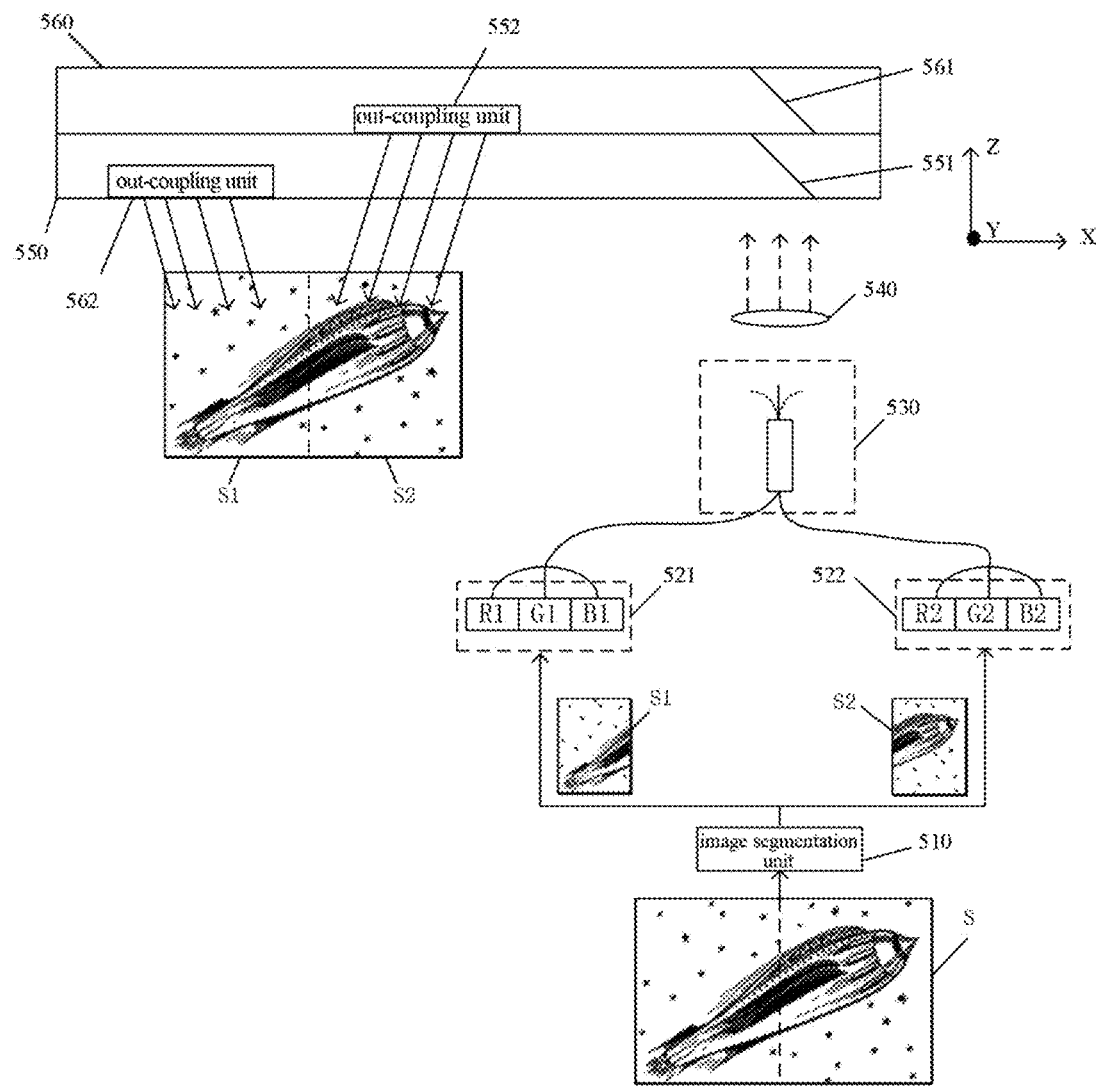
FIG. 7A is a schematic diagram showing a structure of further another waveguide display module disclosed in an embodiment of the present disclosure.

The following describes structures of the waveguide module and structures of the in-coupling units and the out-coupling units in the waveguide module in conjunction with FIGS. 6A, 6B, 6C, 6D, and 7A, among which, FIGS. 6A, 6B, 6C, and 6D give an example of in-coupling units arranged in six layers for description, and FIG. 7A gives an example of in-coupling units arranged in two layers for description.

As an alternative embodiment, in FIG. 6A, assuming that each group of light sources includes three types of light-emitting units namely R, G, and B, then the in-coupling unit in each layer is configured to only couple in a light beam generated by one monochromatic laser in the input light source. The in-coupling units are reflection gratings (having for example an in-coupling structure as shown in FIG. 6C) or filters (having for example an in-coupling structure as shown in FIG. 6D). The out-coupling units are out-coupling gratings (having for example an out-coupling structure as shown in FIG. 6C) or out-coupling mirror arrays (having for example an out-coupling structure as shown in FIG. 6D).

To be more specific, as shown in FIG. 6A, the waveguide substrates arranged in six layers are provided therein with in-coupling units which are, in sequence: an in-coupling unit R1, an in-coupling unit G1, an in-coupling unit B1, an in-coupling unit R2, an in-coupling unit G2, an in-coupling unit B2. Among them, the in-coupling unit R1 is used to couple red light of a wavelength R1 in mixed beams into a waveguide substrate 451 in a first layer, and other light beams are transmitted through the in-coupling unit R1; the in-coupling unit G1 is used to couple green light of a wavelength G1 in the mixed beams into a waveguide substrate 452 in a second layer, and other light beams are transmitted through the in-coupling unit G1; and the in-coupling unit B1 is used to couple blue light of a wavelength B1 in the mixed beams into a waveguide substrate 453 in a third layer, and other light beams are transmitted through the in-coupling unit B1. A second group of waveguide substrates 460 is also provided with in-coupling units arranged in three layers, which are: an in-coupling unit R2, an in-coupling unit G2, and an in-coupling unit B2. Among them, the in-coupling unit R2 is used to couple red light of a wavelength R2 in mixed beams into waveguide substrate 454 in a fourth layer, other light beams are transmitted through the in-coupling unit R2; the in-coupling unit G2 is used to couple green light of a wavelength G2 in the mixed beams into a waveguide substrate 455 in a fifth layer, and other light beams are transmitted through the in-coupling unit G2; and the in-coupling unit B2 is used to couple blue light of a wavelength B2 in the mixed beams into a waveguide substrate 456 in a sixth layer. Here, a stacking order of all the in-coupling units may not be limited to those as shown in the figure. In addition, a last in-coupling unit of a waveguide substrate in a last layer may be an ordinary in-coupling unit used to couple remaining light beams into the waveguide without the need of selecting a wavelength. That is, in FIG. 6A, the in-coupling unit B2 may be configured as an ordinary in-coupling unit for which a wavelength is no longer needed to be selected.

The waveguide substrates arranged in six layers are provided with out-coupling units arranged in six layers, which are: an out-coupling unit R1, an out-coupling unit G1, an out-coupling unit B1, an out-coupling unit R2, an out-coupling unit G2, and an out-coupling unit B2. These six out-coupling units each are configured to couple out a light beam coupled in by a corresponding in-coupling unit. The out-coupling units are out-coupling gratings (having for example an out-coupling structure as shown in FIG. 6C) or out-coupling mirror arrays (having for example an out-coupling structure as shown in FIG. 6D). Out-coupling units of waveguides that transmit light beams of different sub-images are spaced apart from each other by a certain distance so that the light beams that are coupled out may be spliced into the original image S to be displayed.

When all the above in-coupling units are reflection gratings, as shown in FIG. 6C, such a reflection grating has a certain bandwidth and only reflects a light beam of a wavelength within the bandwidth into the waveguide; and light beams of other wavebands are transmitted through the reflection grating. Take the in-coupling unit R1 as an example. FIG. 6B is a diagram showing reflection efficiency of the in-coupling unit R1, in which a horizontal coordinate represents the wavelength of the light beam incident on the in-coupling unit R1, and the vertical coordinate is the reflection efficiency of the in-coupling unit R1. As can be seen from the figure, the in-coupling unit R1 only reflects and couples in red light of a wavelength of 650 nm, and hardly reflects, but directly transmits, light beams of other wavebands.

When all the above in-coupling units are filters, as shown in FIG. 6D, such a filter has a certain bandwidth and only reflects a light beam of a wavelength within the bandwidth into the waveguide; and light beams of other wavebands are transmitted through the filter. The filters may be band-pass filters or other filters with similar functions. Principles for selecting specific wavelengths for these filters are similar to those for selecting specific wavelengths for the above-mentioned reflection gratings, and thus will not be repeated herein.

Figure 6E:
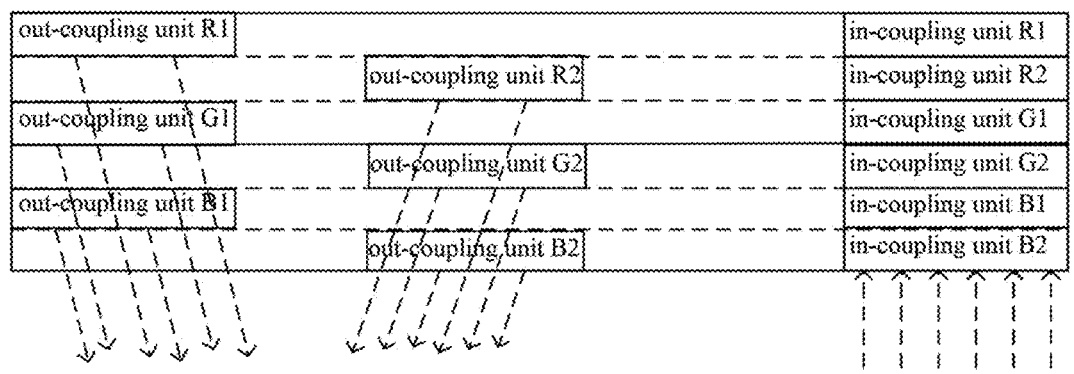
FIG. 6E is a schematic diagram of further another structure of the waveguide module in the display module shown in FIG. 6A.
Figure 6F:
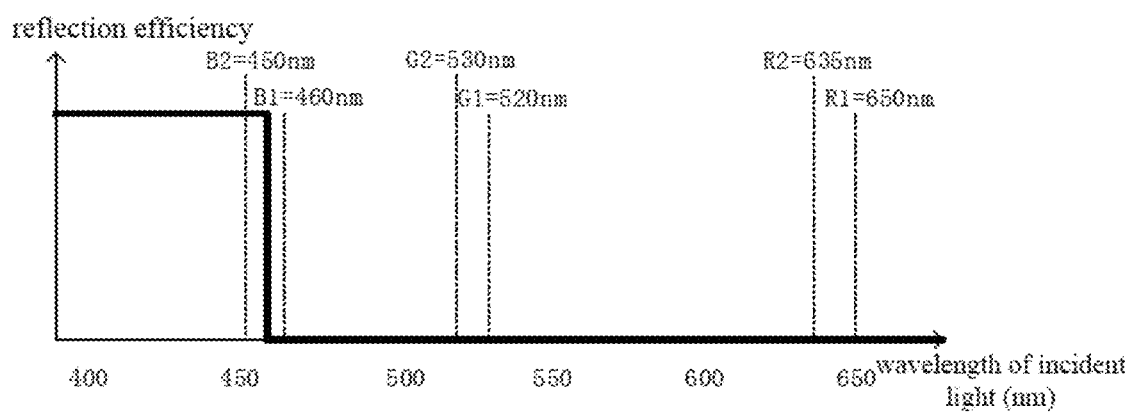
FIG. 6F is a schematic diagram showing reflection efficiency of an in-coupling unit B2 in the display module shown in FIG. 6A.

As a preferred embodiment, all of the above in-coupling units may also be long-wave pass filters or short-wave pass filters. FIG. 6E gives an example in which all the in-coupling units are long-wave pass filters, and cutoff wavelengths gradually increase from an in-coupling unit in a first layer to an in-coupling unit in a last layer, so that the in-coupling unit in each layer only couples in a light beam of one of the R, G, and B colors of a corresponding sub-image. When the fiber scanning module of FIG. 4B is used as the image generation unit, it is assumed that a wavelength of each laser in FIG. 4B is configured as follows: an emission wavelength of the red laser R1 is 650 nm, an emission wavelength of the green laser G1 is 530 nm, and an emission wavelength of the blue laser B1 is 460 nm; an emission wavelength of the red laser R2 is 635 nm, an emission wavelength of the green laser G2 is 520 nm, and an emission wavelength of the blue laser B2 is 450 nm. In this case the six layers of waveguide substrates in FIG. 6E are provided therein with in-coupling units that are arranged in a descending order according to wavelengths of light beams to be coupled in: an in-coupling unit B2, an in-coupling unit B1, an in-coupling unit G2, an in-coupling unit G1, an in-coupling unit R2, and an in-coupling unit R1. As shown in FIG. 6F, the cut-off wavelength of the in-coupling unit B2 is 455 nm, which may right reflect a 450-nm-wavelength light beam emitted by the blue laser B2; light beams produced by other lasers each have a wavelength (the emission wavelength of the red laser R1 is 650 nm, the emission wavelength of the green laser G1 is 530 nm, and the emission wavelength of the blue laser B1 is 460 nm; the emission wavelength of the red laser R2 is 635 nm, and the emission wavelength of the green laser G2 is 520 nm) larger than the cut-off wavelength 455 nm of the in-coupling unit B2, and are therefore transmitted through the in-coupling unit B2; the cut-off wavelengths of said other in-coupling units gradually increase. Through this kind of special stacking and the gradual increase configuration of the cut-off wavelengths, each in-coupling unit is enabled to only couple in a light beam of one wavelength so as to separate each sub-image from the mixed beams.

All the above in-coupling units may also be short-wave pass filters. At this time, cut-off wavelengths of the short-wave pass filters are configured to gradually decrease from the in-coupling unit in the first layer to the in-coupling unit in the last layer. Principles of the wavelength selection are the same as the above-mentioned long-wave pass filters, and therefore will not be repeated herein. Similarly, the in-coupling unit in the last layer may be configured as an ordinary in-coupling unit used to couple the remaining light beam into the waveguide without the need for wavelength selection.

Figure 7B:
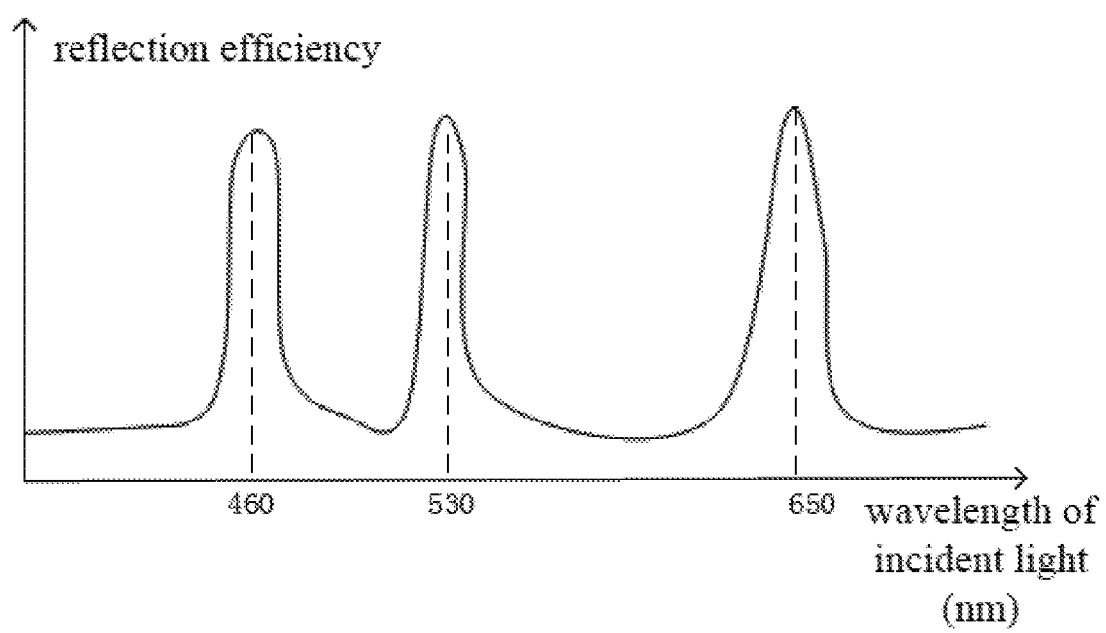
FIG. 7B is a schematic diagram showing reflection efficiency of a filter of the display module shown in FIG. 7A.

As another alternative embodiment, the waveguide module may include waveguide substrates stacked in N layers, an in-coupling unit in each group of waveguide substrates being a filter. Assuming that each group of light sources includes three types of light-emitting units namely R, G, and B, then each filter is designed to reflect light beams of three RGB wavebands in light beams of a corresponding sub-image and transmit light of other wavebands. In a waveguide display module as shown in FIG. 7A, a waveguide substrate in each layer of the display module includes a waveguide. This display module differs from the aforementioned display module of FIG. 6A in that: after image light beams are emitted by a light scanner 530 and then collimated by a collimation device such as an eyepiece optical system 540, a filter 551 arranged in a first waveguide 550 couples light beams of wavelengths R1, G1, and B1 in the mixed beams all into the first waveguide 550 for total reflection, and other light beams are transmitted through the filter 551 into a second waveguide 560; a filter 561 provided in the second waveguide 560 couples light beams of wavelengths R2, G2, and B2 in the mixed beams into the second waveguide 560 for total reflection transmission. The filter 551 provided in the first waveguide 550 and the filter 561 provided in the second waveguide 560 are both filters having three operating wavebands. Here, the filter 551 is taken as an example. FIG. 7B is a diagram showing reflection efficiency of the filter 551. In the figure, a horizontal coordinate represents a wavelength of incident light, and a vertical coordinate represents reflection efficiency. As can be seen from the figure, the filter 551 may reflect red light having a wavelength of 650 nm, green light having a wavelength of 530 nm, and blue light having a wavelength of 460 nm, and can hardly reflect, but directly transmit, light beams of other wavelengths (light beams of other wavelengths herein mainly refer to light beams of wavelengths propagating in the second waveguide).

As an alternative embodiment, in FIG. 7A, in the case that the first waveguide 550 is provided therein with the filter 551, the second waveguide 560 may be provided therein with an ordinary in-coupling unit to couple remaining light beams into the second waveguide without the need for wavelength selection.

Similarly, the out-coupling unit in the first waveguide 550 and the out-coupling unit in the second waveguide 560 may be out-coupling gratings or out-coupling mirror arrays. An out-coupling unit 552 in the first waveguide 550 couples light beams transmitted in the first waveguide out of the first waveguide, and the out-coupling unit 562 in the second waveguide 560 couples light beams transmitted in the second waveguide out of the second waveguide. The out-coupling unit of the first waveguide 550 and the out-coupling unit of the second waveguide 560 are spaced apart from each other by a distance so that light beams that are coupled out may be spliced into the original image S to be displayed.

In the above embodiments, as examples, in the waveguide module, each group of light sources only includes R, G, and B light-emitting units. Those skilled in the art should know that when each group of light sources does not merely include R, G, and B light-emitting units, numbers or parameters of the in-coupling units and out-coupling units of the waveguide module may be adjusted correspondingly according to a same principle of the present disclosure.

Figure 8:
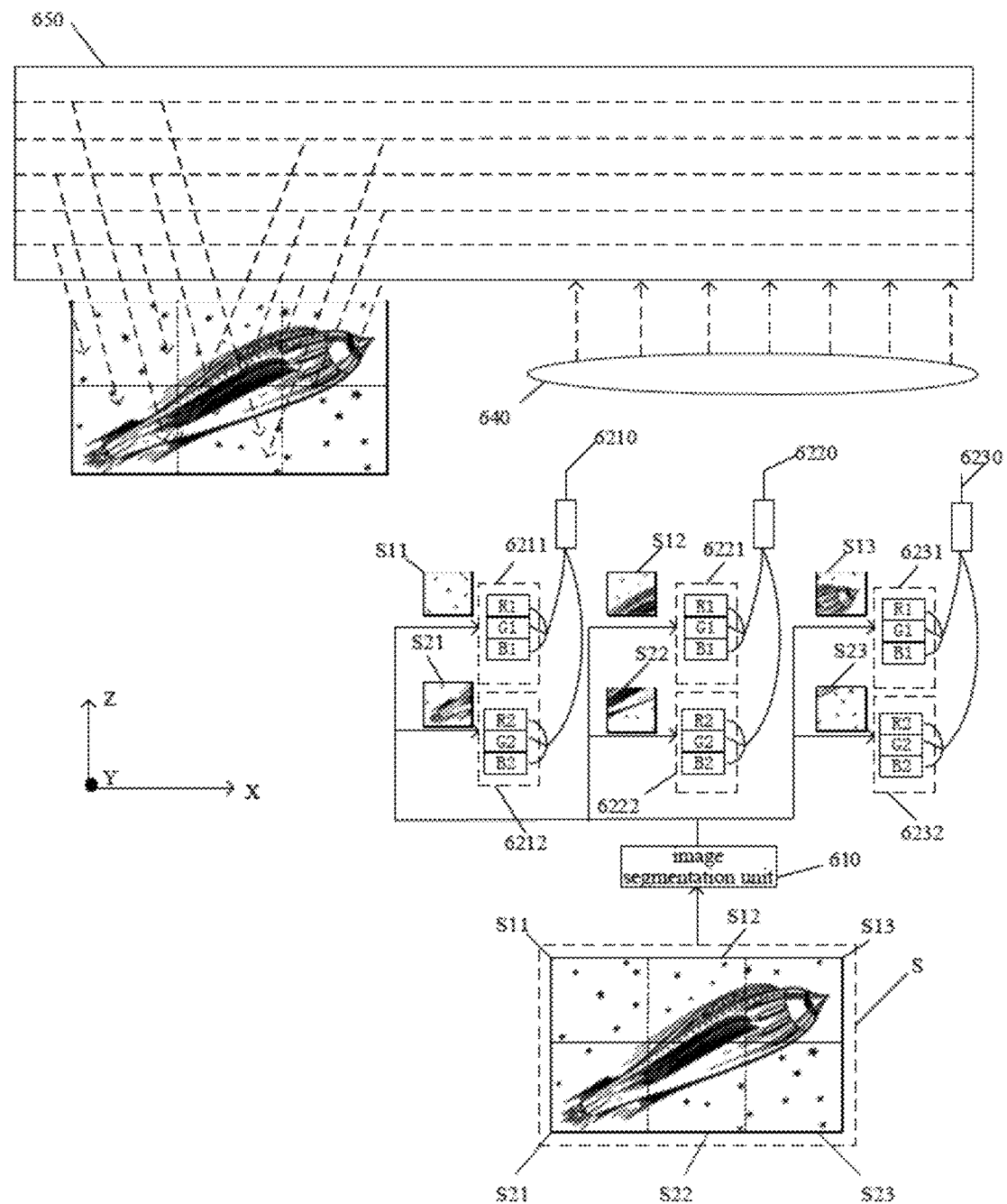
FIG. 8 is a schematic diagram showing a structure of another waveguide display module disclosed in an embodiment of the present disclosure.

The following describes an embodiment in which a fiber scanning module generates through modulation and emits M sub-images simultaneously through a plurality of scanning fibers in conjunction with FIG. 8. At this time, M>N. In a display module shown in FIG. 8, assuming that M=6 and N=2, an image segmentation unit partitions an image to be displayed into six sub-images S11, S12, S13, S21, S22, and S23. The sub-image S11 and the sub-image S21 are generated through modulation by a laser light source 6211 and a laser light source 6212, respectively; and image light beams generated through modulation by the laser light sources 6211 and 6212 are all input into a scanning fiber 6210. The sub-image S12 and the sub-image S22 are generated through modulation by a laser light source 6221 and laser light source 6222, respectively; and image light beams generated through modulation by laser light sources 6221 and 6222 are all input into a scanning fiber 6220. The sub-image S13 and the sub-image S23 are generated through modulation by a laser light source 6231 and a laser light source 6232, respectively; and image light beams generated through modulation by the laser light sources 6231 and 6232 are all input into a scanning fiber 6230. In this way, each pixel scanned by each fiber contains pixel information of two sub-images.

In FIG. 8, the laser light sources 6211, 6221, and 6231 are of same configurations, and each of them includes three monochromatic lasers R1, G1, and B1. The above-mentioned laser light sources 6212, 6222, and 6232 are also of same configurations, and each of them includes three monochromatic lasers R2, G2, and B2. Wavelengths of all the lasers may be configured as follows: an emission wavelength of the red laser R1 is 650 nm, an emission wavelength of the green laser G1 is 530 nm, and an emission wavelength of the blue laser B1 is 460 nm; an emission wavelength of the red laser R2 is 635 nm, an emission wavelength of the green laser G2 is 520 nm, and an emission wavelength of the blue laser B2 is 450 nm.

The light beams generated through modulation by the scanning fibers 6210, 6220, and 6230 are spliced to one another before falling on a waveguide substrate. This splicing refers to splicing of contents, not splicing of physical properties of the scanning beams. After the light beams generated through modulation by the scanning fibers 6210, 6220, and 6230 are collimated by a collimation system 640, the light beams enter a waveguide module 650. The waveguide module 650 couples out the sub-images S11, S12, S13, S21, S22, and S23 following the implementations of the waveguide modules described in the above embodiments to complete splicing of viewing angles at a human eye.

Embodiments of a Flat Panel Display

Figure 9A:
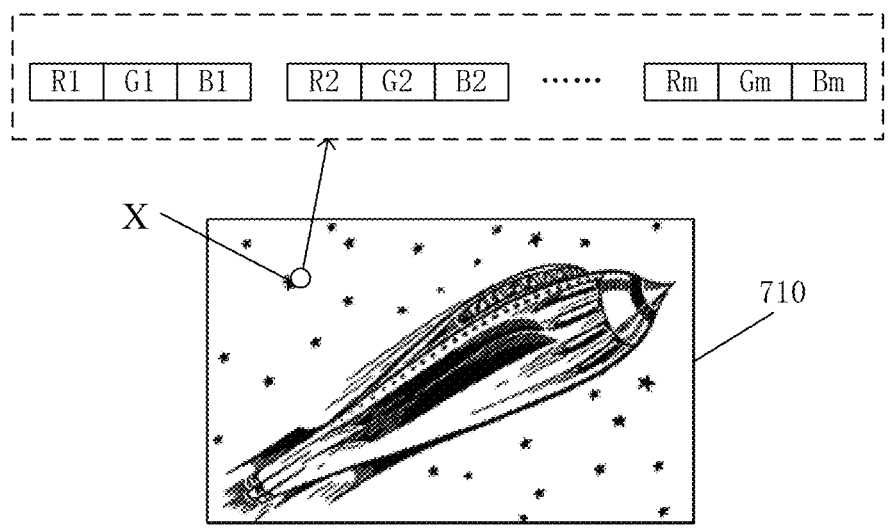
FIG. 9A is a schematic diagram showing a structure of a flat panel display disclosed in an embodiment of the present disclosure.

Based on a same concept as the fiber scanning module, in some embodiments of the present disclosure, a flat panel display is provided. As shown in FIG. 9A, each pixel of the flat panel display includes at least two groups of sub-pixels. Each group of sub-pixels includes three color units R, G, B. Same color units in the groups of sub-pixels are configured with different wavelengths.

In the figure, as can be seen, a pixel point X in the flat panel display 710 contains information of m groups of sub-pixels. Information of each group of sub-pixel is generated through modulation by three color units of R, G, and B of different wavelengths. For example, information of a first group of sub-pixels is generated through modulation by a red-light color unit of a wavelength of R1, a green-light color unit of a wavelength of G1, and a blue-light color unit of a wavelength of B1; information of a second group of sub-pixels is generated through modulation by a red-light color unit of a wavelength of R2, a green-light color unit of a wavelength of G2, and a blue-light color unit of a wavelength of B2; and son on in a similar fashion, information of an m group of sub-pixels is generated through modulation by a red-light color unit of a wavelength of Rm, a green-light color unit of a wavelength of Gm, and a blue-light color unit of a wavelength of Bm.

Figure 9B:
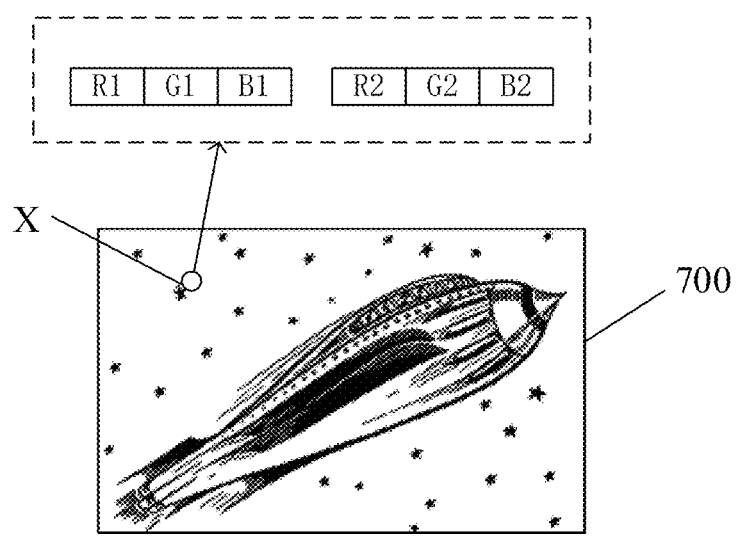
FIG. 9B is a schematic diagram showing a structure of another flat panel display disclosed in an embodiment of the present disclosure.

As a preferred embodiment, as shown in FIG. 9B, a pixel point X in a flat panel display 700 in the figure contains information of two groups of sub-pixels. Information of a first group of sub-pixels is generated through modulation by a red-light color unit of a wavelength of R1, a green-light color unit of a wavelength of G1, and a blue-light color unit of a wavelength of B1; and information of a second group of sub-pixels is generated through modulation by a red-light color unit of a wavelength of R2, a green-light color unit of a wavelength of G2, and a blue-light color unit of a wavelength of B2. It can be appreciated that, by this way, each pixel in the flat panel display 700 described above carries information of two groups of pixels, and one flat panel display 700 may display two images with different contents simultaneously by way of wavelength division multiplexing.

The above flat panel display may be a flat panel display such as a liquid crystal display (LCD), an organic light-emitting diode (OLED) display, a liquid crystal silicon (LCOS) display, a DLP display, etc.

Second Group of Embodiments of a Waveguide Display Module (in which a Flat Panel Display is Used as an Image Generation Subunit)

Figure 10:
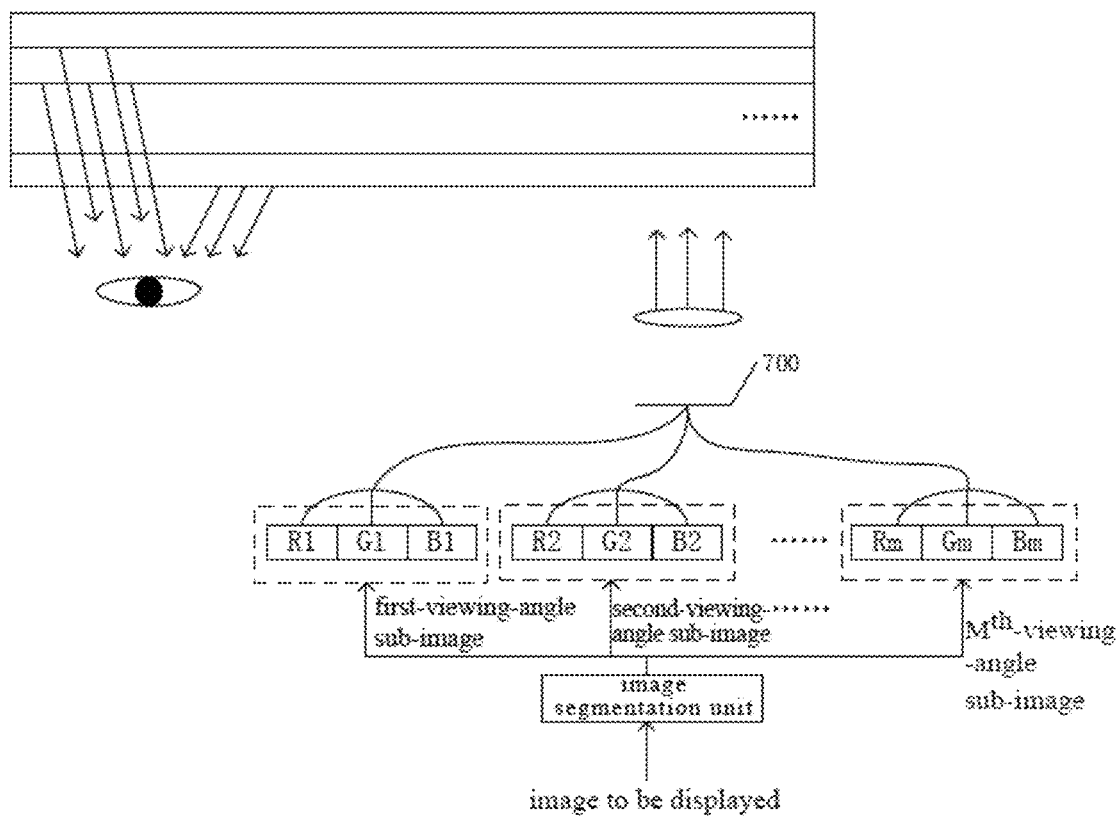
FIG. 10 is a schematic diagram showing a structure of further another waveguide display module disclosed in an embodiment of the present disclosure.
Figure 11:
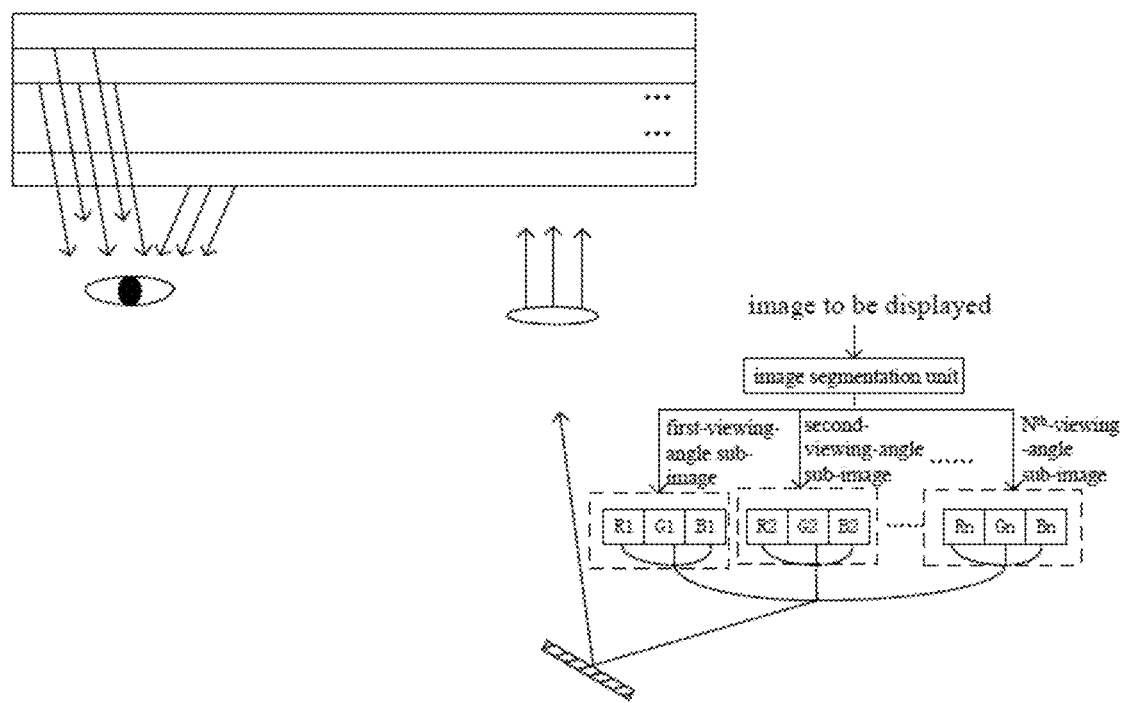
FIG. 11 is a schematic diagram showing a structure of further another waveguide display module disclosed in an embodiment of the present disclosure.

In a waveguide display module of an embodiment as shown in FIG. 10, an image generation unit includes a flat panel display as described in the above embodiments.

The image segmentation unit is used to partition an image to be displayed into M sub-images, where M is an integer greater than or equal to 2.

Each pixel of the flat panel display 700 includes M groups of sub-pixels. The flat panel display generates through modulation mixed light beams containing the M sub-images through wavelength division multiplexing. Light beams of same colors in light beams of the sub-images have different wavelengths. The mixed image light beams displayed by the flat panel display 700 each time is collimated by an eyepiece optical system and then coupled into a waveguide module.

The waveguide module is arranged on a light output path of the flat panel display. The waveguide module has in-coupling units arranged in multiple layers and out-coupling units arranged in multiple layers. An in-coupling unit in each layer is configured to couple in light of a different wavelength range. Emergent images, formed after mixed light beams of an image to be displayed generated by the flat panel display are coupled out by the out-coupling units of the waveguide module, are spliced into the image to be displayed.

In the present disclosure, the flat panel display 700 each time can display at least two sub-images of different viewing angles, and each pixel of the flat panel display 700 carries information of at least two groups of sub-pixels of different viewing angles. Among them, a first-viewing-angle sub-pixel is generated through modulation by a red-light color unit of a wavelength of R1, a green-light color unit of a wavelength of G1, and a blue-light color unit of a wavelength of B1; a second viewing-angle sub-pixel is generated through modulation by a red-light color unit of a wavelength of R2, a green-light color unit of a wavelength of G2, and a blue-light color unit of a wavelength of B2 . . . ; an $N^{th}$-viewing-angle sub-pixel is generated through modulation by a red-light color unit of a wavelength of Rn, a green-light color unit of a wavelength of Gn, and a blue-light color unit of a wavelength of Bn.

In this embodiment, processes of how the waveguide module selects wavelengths of input light beams, couples in and transmits light beams, and then couples out light beams and splices images are the same as those in the first group of embodiments of the waveguide display module, and therefore will not be repeated herein.

Third Group of Embodiments of a Waveguide Display Module

Figure 12:
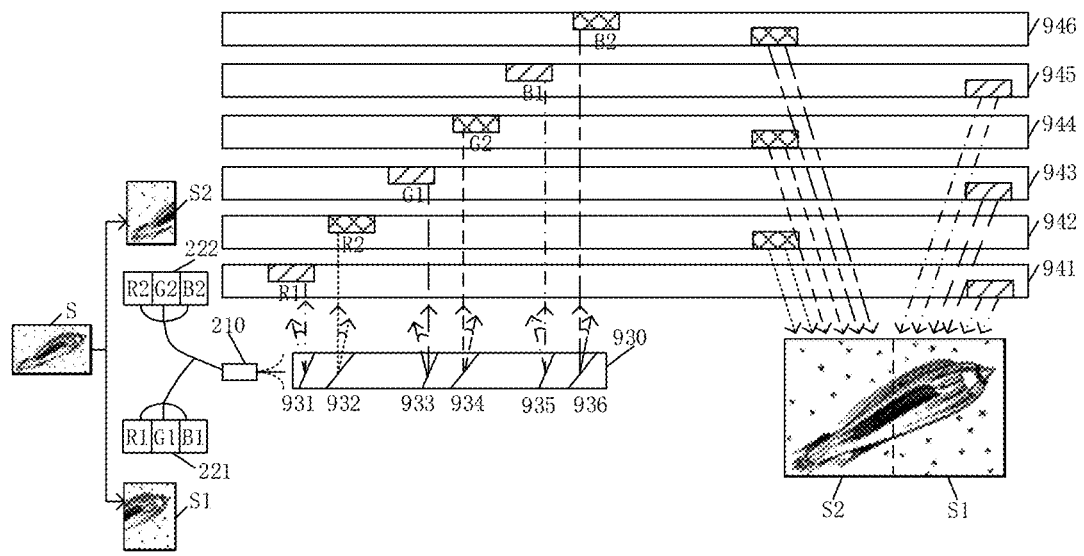
FIG. 12 is a schematic diagram showing a structure of another waveguide display module disclosed in an embodiment of the present disclosure.

In a waveguide display module of an embodiment as shown in FIG. 12, an image segmentation unit is used to partition an image to be displayed into N sub-images, where N is an integer greater than or equal to 2. The N sub-images can be understood as N sub-images of different viewing angles.

Each pixel of the image generation unit includes N groups of sub-pixels. The image generation unit generates through modulation mixed light beams containing the N sub-images through wavelength division multiplexing. Light beams of same colors in light beams of the sub-images have different wavelengths.

A waveguide module is arranged on a light output path of the image generation unit. The waveguide module has in-coupling units arranged in multiple layers and out-coupling units arranged in multiple layers. An in-coupling unit in each of the layers is configured to couple in light of a different wavelength range. Emergent images, formed after mixed light beams of an image to be displayed generated by the image generation unit are coupled out by the out-coupling units of the waveguide module, are spliced into the image to be displayed.

In this embodiment, N groups of light sources modulate sub-images of N different viewing angles respectively to form image light beams. The image light beams are combined and then reflected and scanned out pixel by pixel by a scanning mirror. A red light generator of a first light source produces red light of a wavelength of R1, a green light generator of the first light source produces green light of a wavelength of G1, and a blue light generator of the first light source produces blue light of a wavelength of B1; a red light generator of a second light source produces red light of a wavelength of R2, a green light generator of the second light source produces green light of a wavelength of G2, and a blue light generator of the second light source produces blue light of a wavelength of B2 . . . ; a red light generator of an $N^{th}$ light source produces red light of a wavelength of Rn, a green light generator of the $N^{th}$ light source produces green light of a wavelength of Gn, and a blue light generator of the $N^{th}$ light source produces blue light of a wavelength of Bn.

In this embodiment, the mixed image light beams reflected by the scanning mirror of the MEMS scanner are collimated by an eyepiece optical system and then coupled into N groups of waveguide substrates arranged in a stack. Each group of waveguide substrates only couples in image light beams of a corresponding viewing-angle sub-image. In other words, a first-viewing-angle sub-image light beam is coupled into a first group of waveguide substrates, a second-viewing-angle sub-image light beam is coupled into a second group of waveguide substrates . . . ; an $N^{th}$-viewing-angle sub-image light beam is coupled into an $N^{th}$ group of waveguide substrates. The sub-image light beams of the N viewing angels are transmitted in respective waveguide substrates and then coupled out and spliced into the above-mentioned image to be displayed. This broadens the viewing angle of the display module.

Similarly, in this embodiment, processes of how a waveguide in each layer selects wavelengths of input light beams, couples in and transmits light beams, and then couples out light beams and splices images are the same as those in the first group of embodiments of the waveguide display module, and therefore will not be repeated herein.

Fourth Group of Embodiments of a Waveguide Display Module (in which a Beam Splitter is Provided Between an Image Generation Unit and a Waveguide Module)

In the above first, second, and third groups of embodiments of the waveguide display module, it is required that the waveguide module be designed to have both functions of separating light beams of different wavelengths from the mixed light beams of the image to be displayed and realizing adjustment of a viewing angle, in which case requirements are high in designs and manufacturing techniques of the waveguide module, which is not conducive to mass production. In this embodiment, in order to solve this problem, a beam splitter is provided between the image generation unit and the waveguide module. The beam splitter can share the work of beam splitting and part of the work of adjusting viewing angles, thereby reducing the difficulties in designing and manufacturing the waveguide module. The first, second, and third groups of embodiments can all be improved in a same manner as this embodiment.

Figure 13:
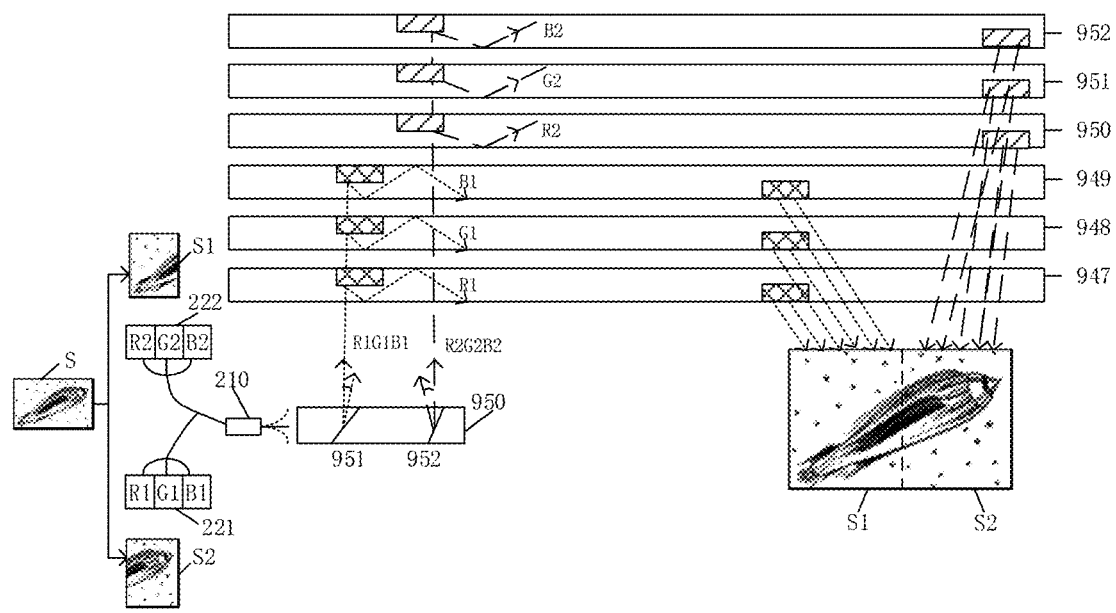
FIG. 13 is a schematic diagram showing a structure of another waveguide display module disclosed in an embodiment of the present disclosure.

Referring to FIG. 12, which is a schematic diagram showing a structure of a waveguide display module according to this embodiment of the present disclosure. In FIGS. 12 and 13, as an example, the fiber scanning module in FIG. 4B is used as the image generation unit.

Shown at the lower left corner of the figure is an image S to be displayed. The first group of light sources 221 (of wavelengths R1, G1, B1) and the second group of light sources 222 (of wavelengths R2, G2, B2) generate through modulation a first-viewing-angle image S1 and a second-viewing-angle image S2 of the image S to be displayed, respectively. Light beams of the first-viewing-angle image S1 and the second-viewing-angle image S2 are input into a same scanning fiber of the fiber scanning display 210 for being scanned.

The fiber scanning display 210 is provided on a light output path thereof with a beam splitter 930. The beam splitter 930 may include a plurality of dichroic filters. The dichroic filters may be one or more selected from band-pass filters, short-wave pass filters, and long-wave pass filters. The beam splitter 930 is used to separate light beams of different wavelengths and meanwhile adjust, by adjusting a reflection angle of each of the dichroic filters, an emergence angle of each separated light beam. When the beam splitter adopts a plurality of long-wave pass filters, cut-off wavelengths of the long-wave pass filters gradually increase; and when the beam splitter adopts short-wave pass filters, cut-off wavelengths of the short-wave pass filters gradually decrease. The in-coupling unit in each layer only couples in a light beam of one wavelength in the mixed light beams of the image to be displayed. FIG. 12 gives an example in which the beam splitter 930 is provided with six short-wave pass filters 931-936 on a same optical axis. These six short-wave pass filters have cut-off wavelengths that gradually decrease, and are configured to reflect light beams of wavelengths R1, R2, G1, G2, B1, B2 (650 nm, 635 nm, 530 nm, 520 nm, 460 nm, 450 nm), respectively. Among them, the short-wave pass filters 931, 933, 935 reflect light beams of three wavelengths of a same sub-image (the first-viewing-angle image S1), and therefore, when being designed, the three short-wave pass filters 931, 933, 935 have a same reflection angle; the short-wave pass filters 932, 934, 936 reflect light beams of three wavelengths of a same sub-image (the second-viewing-angle image S2), and therefore, the three short-wave pass filters 932, 934, 936 have a same reflection angle. The reflection angle of the three short-wave pass filters 932, 934, 936 is different from that of the three short-wave pass filters 931, 933, and 935. The smaller an overlap between light-cone angles formed when the two groups of light beams are emitted out is, the larger a spliced viewing angle is.

Assuming that in FIG. 12 a swing angle of the scanning fiber is in a range of −20° to 20°, by setting an angle of each of the short-wave pass filters 931, 932, 933, 934, 935, 936, the light beams (R1, G1, B1) of the first-viewing-angle image S1 can be enabled to enter in-coupling gratings of waveguides 941, 943, and 945 at an angle in a range of −40° to 0°, and the light beams (R2, G2, B2) of the second-viewing-angle image S2 can be enabled to enter in-coupling gratings of waveguides 942, 944, 946 at an angle in a range of 0° to 40°.

When the beam splitter adopts band-pass filters, the beam splitter 930 in FIG. 12 can also adopt six band-pass filters, each band-pass filter only configured to reflect light of one wavelength. Of course, when the beam splitter adopts band-pass filters, the beam splitter 950 as shown in FIG. 13, for example, may also be provided with two band-pass filters 951 and 952 configured to reflect a group of light beams having wavelength of R1, G1, B1 (650 nm, 530 nm, 460 nm) and a group of light beams having wavelength of R2, G2, B2 (635 nm, 520 nm, 450 nm), respectively. Similarly, because the two band-pass filters 951 and 952 reflect different-viewing-angle images, the two need to be configured to have different reflection angles. Similarly, the smaller an overlap between light-cone angles formed by reflection of the band-pass filters 951 and 952 is, the larger a spliced viewing angle is.

The waveguide module is arranged on a light output path of the beam splitter. The waveguide module has in-coupling units arranged in multiple layers and out-coupling units arranged in multiple layers. An in-coupling unit in each layer couples light of a different wavelength range. The out-coupling units are out-coupling gratings or out-coupling mirror arrays. In FIG. 12, the beam splitter 930 produces, by way of splitting, six light beams that are arranged in a staggered manner; the in-coupling gratings of the waveguides 941, 942, 943, 944, 945, and 946 each are arranged at a light output position of a corresponding light beam and couples the light beam into a corresponding waveguide for transmission; the in-coupling gratings, relay gratings, and the out-coupling gratings in the waveguides 941, 943, 945 cooperate with each other to couple the light beams of the first-viewing-angle image S1 out at a first viewing angle; and the in-coupling gratings, relay gratings, and the out-coupling gratings in the waveguides 942, 944, 946 cooperate with each other to couple the light beams of the second-viewing-angle image S2 out at a second viewing angle; the first-viewing-angle image S1 and the second-viewing-angle image S2 are spliced to each other outside the waveguides to form a complete-viewing-angle image. In FIG. 13, the beam splitter 930 produces, by way of splitting, two groups of light beams that are arranged in a staggered manner, among which the first group of light beams are light beams of a first-viewing-angle image having wavelengths R1, G1, B1, and the second group of light beams are light beams of a second-viewing-angle image having wavelengths R2, G2, B2. In-coupling gratings of waveguides 947, 948, 949, 950, 951, and 952 are provided at light output positions of the two light beams; the in-coupling gratings of the waveguides 947, 948, 949 are arranged on an optical path and are configured to couple the light beams of the first-viewing-angle image having wavelengths R1, G1, B1 into respective waveguides for transmission; and the in-coupling gratings of the waveguides 950, 951, 952 are arranged on another optical path and are configured to couple the light beams of the second-viewing-angle image having wavelengths R2, G2, B2 into respective waveguides for transmission; the in-coupling gratings, relay gratings, and the out-coupling gratings in the waveguides 947, 948, 949 cooperate with each other to couple the light beams of the first-viewing-angle image S1 out at a first viewing angle; the in-coupling gratings, relay gratings, and the out-coupling gratings in the waveguides 950, 951, 952, cooperate with each other to couple the light beams of the second-viewing-angle image S2 out at a second viewing angle; the first-viewing-angle image S1 and the second-viewing-angle image S2 are spliced together outside the waveguides to form a complete-viewing-angle image.

Figure 14:
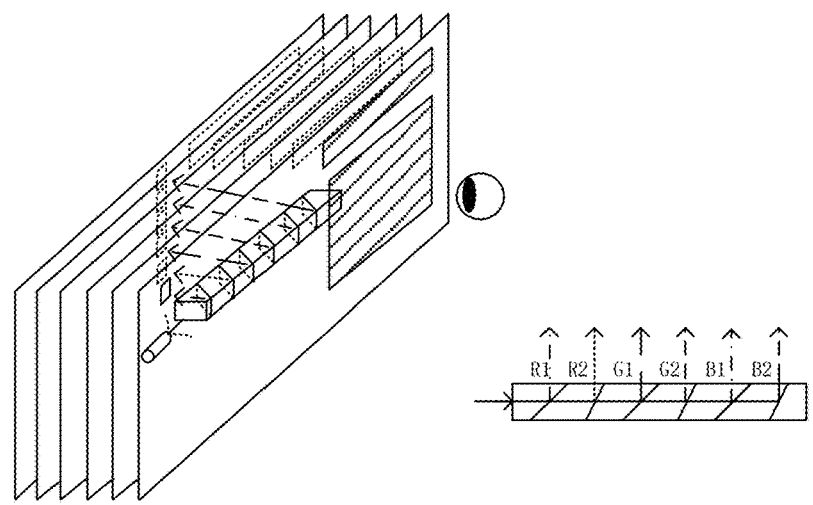
FIG. 14 is a first schematic diagram showing a structure of a beam splitter shown in FIG. 12.
Figure 15:
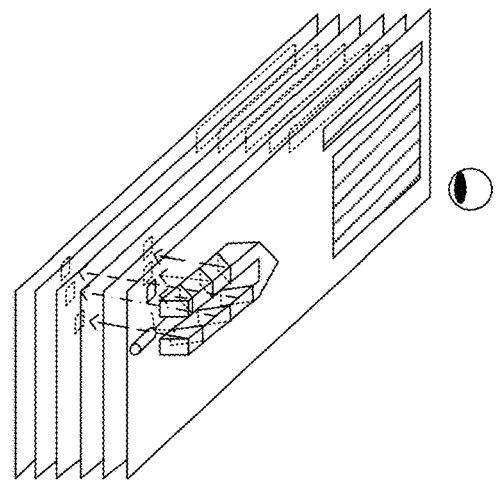
FIG. 15 is a second schematic diagram showing a structure of the beam splitter shown in FIG. 12.
Figure 16:
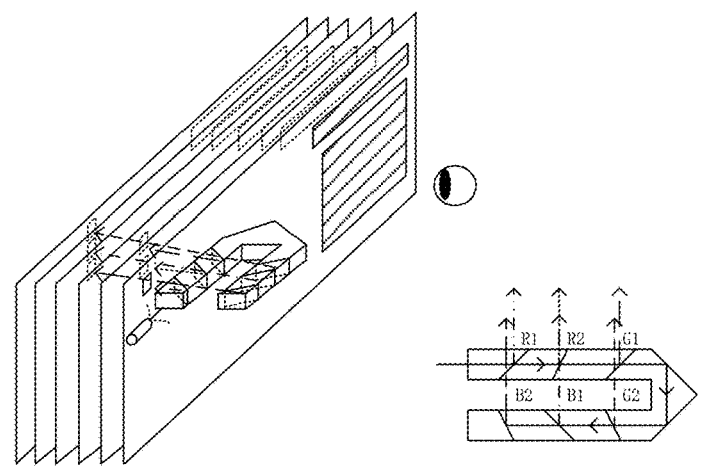
FIG. 16 is a third schematic diagram showing a structure of the beam splitter shown in FIG. 12.

The beam splitter may be arranged in a horizontally in-line staggered manner, as shown in FIG. 14, or in a folded staggered manner, as shown in FIG. 15, or in a folded manner, as shown in FIG. 16. The arrangement in a folded manner may provide a design of a more compact in-coupling structure.

Similarly, in the fourth group of embodiments of the waveguide display module, when the image generation unit generates through modulation and emits the M sub-images simultaneously through a plurality of image generation sub-units, the light beams produced by the plurality of image generation sub-units are spliced to each other before falling on the beam splitter.

In all the embodiments of the present disclosure, the "image to be displayed" may be a complete image, or a partial image of a complete image. That is, the waveguide display module in the embodiments of the present disclosure per se may serve as an independent module to independently process a complete-viewing-angle image, or serve as a part of a splicing module to only process a partial-viewing-angle image and realize a complete-viewing-angle image after being spliced to a plurality of other similar modules.

In all the embodiments of the waveguide display module, as a preferred embodiment, each group of waveguide substrates is provided with a relay unit for pupil expansion in a direction perpendicular to a pupil expansion direction of the out-coupling units. The relay unit may be a relay grating or a mirror array. Taking a relay grating in FIG. 6A as an example, the out-coupling unit in the figure performs pupil expansion in the Y direction, and the relay grating performs pupil expansion in the X direction.

In all the embodiments of the waveguide display module, when the image segmentation unit partitions the image to be displayed into a plurality of sub-images, adjacent sub-images may or may not have a same image area. When adjacent sub-images have a same image area, there will be an overlapping part when the adjacent sub-images are spliced to each other, but at last presented to the human eye is still the above-mentioned image to be displayed.

Additionally, in some embodiments of the present disclosure, it is also provided a near-eye display device using the waveguide display module according to the embodiments of the present disclosure.

The waveguide display module of the present disclosure uses wavelength division multiplexing, with a resolution and a viewing angle that it realizes being maintained the same, the waveguide display module can therefore reduce the number of scanning fibers, which is beneficial to miniaturized production of near-eye display devices. In other words, by utilizing the present disclosure, both a large viewing angle and miniaturization of a near-eye display module can be realized.

All features or steps of all methods or processes disclosed in this description, except mutually exclusive features and/or steps, can be combined in any manner.

Any feature disclosed in this description (including any additional claims, abstract, and drawings), unless otherwise stated, can be replaced by other equivalent or alternative features with similar purposes. That is, unless otherwise stated, each feature is just an example of a series of equivalent or similar features.

The present disclosure is not limited to the foregoing specific embodiments but extends to any new feature or any new combination as well as any step of a new method or process or any new combination disclosed in this description.

The invention claimed is:

1. A waveguide display module, comprising:
an image segmentation unit for partitioning an image to be displayed into M sub-images, M being an integer greater than or equal to 2;
an image generation unit comprising one or more image generation sub-units, wherein when the image generation unit comprises at least two image generation sub-units, configurations of wavelengths of light generated by all the image generation sub-units are the same; each of the image generation sub-units generates through modulation mixed light beams of N sub-images through wavelength division multiplexing, light beams of a same color in the light beams of the N sub-images generated by each of the image generation sub-units having different wavelengths, N being an integer greater than or equal to 2; the M sub-images are generated through modulation and emitted by the image generation unit simultaneously by means of the one or more image generation sub-units, collimated by a collimation optical system, and then form mixed light beams of the image to be displayed containing light beams of the M sub-images; and
a waveguide module arranged on a light output path of the image generation unit, wherein the waveguide module has in-coupling units arranged in multiple layers and out-coupling units arranged in multiple layers, an in-coupling unit in each of the layers being configured to couple in light of a different wavelength range, wherein emergent images, formed after the mixed light beams of the image to be displayed generated by the image generation unit are coupled out by the out-coupling units of the waveguide module, are spliced into the image to be displayed.

2. The display module according to claim 1, wherein when the image generation unit generates through modulation and emits the M sub-images simultaneously by means of a plurality of image generation sub-units, light beams generated by the plurality of image generation sub-units are spliced to each other before falling on the waveguide module.

3. The display module according to claim 2, wherein when each of the sub-images is generated through modulation by three types of light-emitting units of R, G, and B, the waveguide module comprises in-coupling units arranged in 3×N layers and out-coupling units arranged in 3×N layers, wherein except an in-coupling unit in a last layer, an in-coupling unit in each of other layers is configured to couple only a light beam of one wavelength in the mixed light beams of the image to be displayed, and the in-coupling units are reflection gratings or filters.

4. The display module according to claim 3, wherein the out-coupling units are out-coupling gratings or out-coupling mirror arrays.

5. The display module according to claim 4, wherein each group of waveguide modules is provided therein with a relay unit for performing pupil expansion in a direction perpendicular to a pupil expansion direction of the out-coupling units.

6. The display module according to claim 4, wherein adjacent sub-images in a plurality of sub-images formed through partitioning by the image segmentation unit have a same image area.

7. The display module according to claim 2, wherein the waveguide module comprises waveguide substrates stacked in N layers, and when each of the sub-images is generated through modulation by three types of light-emitting units of R, G, and B, except an in-coupling unit in a last layer of the N layers of the waveguide substrates, an in-coupling unit of a waveguide substrate in each of other layers is a filter, each filter being designed to reflect light beams of three RGB wavelengths in light beams of a corresponding sub-image and transmit light beams of other wavelengths.

8. The display module according to claim 2, wherein when each of the sub-images is generated through modulation by three types of light-emitting units of R, G, and B, the waveguide module comprises in-coupling units arranged in 3×N layers and out-coupling units arranged in 3×N layers, wherein except an in-coupling unit in a last layer, all other in-coupling units are long-wave pass filters or short-wave pass filters; when all the in-coupling units are long-wave pass filters, long-wave pass filters from an in-coupling unit in a first layer to an in-coupling unit in a last but one layer have cut-off wavelengths that gradually increase, and when all the in-coupling units are short-wave pass filters, short-wave pass filters from an in-coupling unit in a first layer to an in-coupling unit in a last but one layer have cut-off wavelengths that gradually decrease; an in-coupling unit in each layer only couples a light beam of one wavelength in the mixed light beams of the image to be displayed.

9. The display module according to claim 8, wherein the out-coupling units are out-coupling gratings or out-coupling mirror arrays.

10. The display module according to claim 9, wherein each group of waveguide modules is provided therein with a relay unit for performing pupil expansion in a direction perpendicular to a pupil expansion direction of the out-coupling units.

11. The display module according to claim 9, wherein adjacent sub-images in a plurality of sub-images formed through partitioning by the image segmentation unit have a same image area.

12. The display module according to claim 1, wherein the image generation unit is a fiber scanning module with a fiber scanning display and an input light source, wherein the fiber scanning display comprises at least one scanning fiber, wherein one scanning fiber corresponds to one path of input light source, one path of the input light source comprising N groups of light sources, wherein each group of light sources comprises at least three types of light-emitting units of R, G, and B.

13. The display module according to claim 1, wherein the image generation unit is a MEMS scanning module, the MEMS scanning module comprises a MEMS scanner and a light-emitting light source, wherein the light-emitting light source comprises N groups of light sources, wherein each group of light sources comprises at least three types of light-emitting units of R, G, and B.

14. A display device comprising at least one group of the waveguide display modules, each of the waveguide display modules comprising:
an image segmentation unit for partitioning an image to be displayed into M sub-images, M being an integer greater than or equal to 2;
an image generation unit comprising one or more image generation sub-units, wherein when the image generation unit comprises at least two image generation sub-units, configurations of wavelengths of light generated by all the image generation sub-units are the same; each of the image generation sub-units generates through modulation mixed light beams of N sub-images through wavelength division multiplexing, light beams of a same color in the light beams of the N sub-images generated by each of the image generation sub-units having different wavelengths, N being an integer greater than or equal to 2; the M sub-images are generated through modulation and emitted by the image generation unit simultaneously by means of the one or more image generation sub-units, collimated by a collimation optical system, and then form mixed light beams of the image to be displayed containing light beams of the M sub-images; and
a waveguide module arranged on a light output path of the image generation unit, wherein the waveguide module has in-coupling units arranged in multiple layers and out-coupling units arranged in multiple layers, an in-coupling unit in each of the layers being configured to couple in light of a different wavelength range, wherein emergent images, formed after the mixed light beams of the image to be displayed generated by the image generation unit are coupled out by the out-coupling units of the waveguide module, are spliced into the image to be displayed.

* * * * *